United States Patent [19]

Büch

[11] Patent Number: 5,021,558

[45] Date of Patent: Jun. 4, 1991

[54] WATER-SOLUBLE FIBER REACTIVE DYES

[75] Inventor: Holger M. Büch, Hofheim am Taunus, Fed. Rep. of Germany

[73] Assignee: Hoechst Aktiengesellschaft, Frankfurt am Main, Fed. Rep. of Germany

[21] Appl. No.: 496,534

[22] Filed: Mar. 20, 1990

[30] Foreign Application Priority Data

Mar. 22, 1989 [DE] Fed. Rep. of Germany ....... 3909391
Oct. 10, 1989 [DE] Fed. Rep. of Germany ....... 3933768

[51] Int. Cl.$^5$ ............... C09B 62/04; C09B 62/503; D06P 1/382; D06P 1/384

[52] U.S. Cl. .................. 534/618; 534/594; 534/598; 534/622; 534/623; 534/624; 534/625; 534/634; 534/635; 534/636; 534/637; 534/638; 534/641; 534/642; 534/643; 540/126; 544/101; 544/181; 544/189; 544/204; 544/208; 544/209; 564/440

[58] Field of Search ............ 534/618, 622, 623, 624, 534/625, 634, 635, 636, 637, 638, 641, 642, 643; 540/126; 544/101, 181, 189, 204, 208, 209; 552/227

[56] References Cited

U.S. PATENT DOCUMENTS 4,812,558 3/1989 Omura et al. .................. 534/642 X

FOREIGN PATENT DOCUMENTS 307817 3/1989 European Pat. Off. ........... 534/638

Primary Examiner—Floyd D. Higel
Assistant Examiner—Fiona T. Powers

[57] ABSTRACT

Water-soluble fiber-reactive azo, metal complex azo, anthraquinone, phthalocyanine, formazan, azomethine, dioxazine, phenazine, stilbene, triphenylemthane, xanthene, thioxanthone, nitroaryl, naphthoquinone, pyrenequinone or perylenetetracarbimide dyes which contain once or twice the group of the general formula

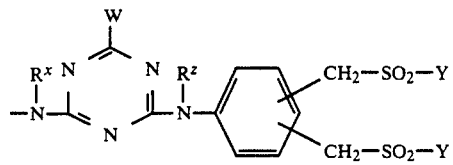

in which:
$R^x$ and $R^z$ are, independently of one another, hydrogen or lower alkyl, which can be substituted by halogen, hydroxyl, cyano, lower alkoxy, lower alkoxycarbonyl, carboxyl, sulfamoyl, sulfo or sulfato;
W is fluorine, chlorine, bromine, sulfo, phenylsulfonyl or alkylsulfonyl of 1 to 4 carbon atoms;
Y is vinyl, β-substituted, β-thiosulfatoethyl, β-phosphatoethyl, β-alkanoyloxyethyl of 2 to 5 carbon atoms in the alkanoyl radical, β-benozoyloxyethyl, β-(sulfobenzoyloxy)ethyl, β-(p-toluenesulfonyloxy)ethyl or β-halogenoethyl.

The fiber-reactive dyes are highly suitable for the dyeing of carboxamido-containing and/or hydroxyl-containing materials, such as, for example, synthetic polyamide fiber materials, wool and in particular cellulose fiber materials with a high degree of fixation in hues which have a high color strength and good fastness properties.

13 Claims, No Drawings

WATER-SOLUBLE FIBER REACTIVE DYES

The invention is in the technical field of fiber-reactive dyes.

The practice of dyeing using reactive dyes has recently led to increased demands on the quality of the dyeings and the economy of the dyeing process. Consequently, there is still a need for new reactive dyes having improved properties, not only in respect to the fastness properties but also a high degree of fixation on the material to be dyed. Thus, European Patent Application Publication No. 0,144,766A discloses fiber-reactive dyes which contain a triazine radical to which two fiber-reactive radicals from the vinyl sulfone series are bound in each case via an ethyleneoxyethylamino group. Nevertheless, the object of the present invention was to find new reactive dyes which are improved in this respect and which are capable of dyeing, in particular, cotton in all hues and have good suitability in exhaust processes, the cold pad-batch methods and printing processes.

This object was achieved by means of the present invention by finding water-soluble dyes which have the following general formula (1).

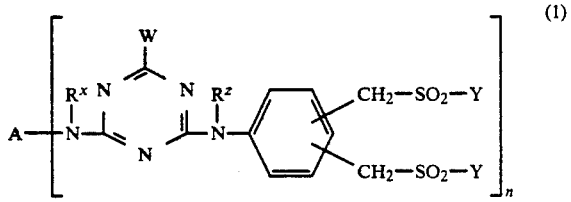

In formula (1), the symbols have the following meanings:

A is the radical of a monoazo, disazo or polyazo dye or of a heavy metal complex azo dye derived therefrom, such as a 1:2 chromium or 1:2 cobalt complex or in particular a 1:1 copper complex monoazo or disazo dye, or is the radical of an anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye;

$R^x$ is hydrogen or alkyl of 1 to 4 carbon atoms, such as methyl or ethyl, which can be substituted by halogen, such as chlorine and bromine, hydroxyl, cyano, alkoxy of 1 to 4 carbon atoms, such as methoxy and ethoxy, alkoxycarbonyl of 2 to 5 carbon atoms, carboxyl, sulfamoyl, sulfo or sulfato, and is preferably hydrogen or methyl;

$R^z$ is hydrogen or alkyl of 1 to 4 carbon atoms, such as methyl or ethyl, which can be substituted by halogen, such as chlorine and bromine, hydroxyl, cyano, alkoxy of 1 to 4 carbon atoms, such as methoxy and ethoxy, alkoxycarbonyl of 2 to 5 carbon atoms, carboxyl, sulfamoyl, sulfo or sulfato, and is preferably hydrogen;

W is fluorine, chlorine, bromine, sulfo, phenylsulfonyl or alkylsulfonyl of 1 to 4 carbon atoms, such as methylsulfonyl or ethylsulfonyl, preferably fluorine or chlorine;

Y is vinyl or β-sulfatoethyl, β-thiosulfatoethyl, β-phosphatoethyl, β-alkanoyloxyethyl of 2 to 5 carbon atoms in the alkanoyl radical, such as β-acetoxyethyl, or is β-benzoyloxyethyl, β-(sulfobenzoyloxy)ethyl, β-(p-toluenesulfonyloxy)ethyl or β-halogenoethyl, β-bromoethyl or β-chloroethyl, preferably vinyl and in particular β-sulfatoethyl;

n is the number 1 or 2, preferably 1.

A is preferably the radical of a mono- or disazo dye or is the radical of an o,o'-1:1 copper complex azo dye or of a copper complex formazan dye, an anthraquinone dye or phthalocyanine dye, such as a copper phthalocyanine dye.

The radical A can contain, bound to its basic structure, substituents customary for organic dyes, such as, for example: alkyl groups of 1 to 4 carbon atoms, such as methyl, ethyl, propyl, isopropyl or butyl, of these, preferably ethyl and in particular methyl; alkoxy groups of 1 to 4 carbon atoms, such as methoxy, ethoxy, propoxy, isopropoxy and butoxy, of these, preferably ethoxy and in particular methoxy; acylamino groups of 2 to 8 carbon atoms, such as an acetylamino, propionylamino or benzoylamino group; primary and mono- or disubstituted amino groups, such as alkylamino groups and dialkylamino groups of 1 to 4 carbon atoms in the alkyl radical, it being possible for the alkyl radicals additionally to be substituted, for example by phenyl, sulfophenyl, hydroxyl, sulfato, sulfo and carboxyl, for example methylamino, ethylamino, propylamino, isopropylamino, butylamino, N,N-di(β-hydroxyethyl)amino, N,N-di(β-sulfatoethyl)amino, sulfobenzylamino, N,N-di(sulfobenzyl)amino and diethylamino groups; alkoxycarbonyl groups having an alkyl radical of 1 to 4 carbon atoms, such as methoxycarbonyl and ethoxycarbonyl; alkylsulfonyl groups of 1 to 4 carbon atoms, such as methylsulfonyl and ethylsulfonyl; trifluoromethyl, nitro and cyano groups; halogen atoms; such as fluorine, chlorine and bromine; carbamoyl groups which can be mono- or disubstituted by alkyl of 1 to 4 carbon atoms, it being possible for the alkyl radicals to be substituted in turn, such as, for example, by hydroxyl, sulfato, sulfo, carboxyl, phenyl and sulfophenyl, such as, for example, N-methylcarbamoyl and N-ethylcarbamoyl; sulfamoyl groups which can be mono- or disubstituted by alkyl groups of 1 to 4 carbon atoms, and N-phenyl-N-alkylsufamoyl groups having an alkyl group of 1 to 4 carbon atoms, it being possible for these alkyl groups to be substituted in turn by hydroxyl, sulfato, sulfo, carboxyl, phenyl and sulfophenyl, such as, for example, N-methylsulfamoyl, N-ethylsulfamoyl, N-propylsulfamoyl, N-isopropylsulfamoyl, N-butylsulfamoyl, N-(β-hydroxyethyl)sulfamoyl and N,N-di(β-hydroxyethyl)sulfamoyl; N-phenylsulfamoyl, ureido, hydroxyl, carboxyl, sulfomethyl and sulfo groups; β-sulfatoethylsulfonyl, β-thiosulfatoethylsulfonyl, β-phosphatoethylsulfonyl, β-acetoxyethylsulfonyl, β-chloroethylsulfonyl and vinylsulfonyl groups.

The dye radical A is preferably substituted by one or more, such as 2 to 4, sulfo groups, and can furthermore preferably contain substituents selected from the group consisting of methyl, ethyl, methoxy, ethoxy, acetylamino, benzoylamino, amino, chlorine, bromine, ureido, hydroxyl, carboxyl and sulfomethyl.

The dye radical A can also have other fiber-reactive groups known from the literature whose structure is different from that of the general formula (2)

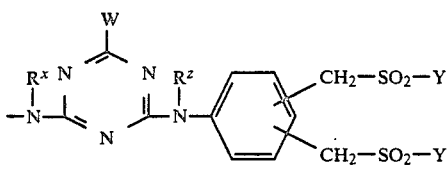

in which $R^x$, $R^z$, W and Y have the abovementioned meanings. Examples of these known fiber-reactive groups comprise a group from the vinylsulfonyl series, such as a group of the formula $-SO_2-Y$ where Y has the abovementioned meaning, which can be bound to A via an alkylene radical, such as a methylene group, or via a methylamino or ethylamino group, or a low-molecular alkanoylamino radical which is substituted by a detachable atom or a detachable group, a low-molecular alkenoylamino or alkenesulfonylamino radical which is unsubstituted or substituted by a detachable atom or a detachable group or a carbocyclic, carbocyclic-heterocyclic or heterocyclic radical which is substituted by a detachable atom or a detachable group, which are bound to the radical A via a carbonylamino or sulfonylamino group, the heterocyclic portions of these radicals being four-, five- or six-membered, or a triazinyl or pyrimidinyl radical which is bound to the radical A via an amino, methylamino or ethylamino group and substituted by a detachable atom or a detachable group. Examples of this type of radicals include a halogen-substituted six-membered heterocyclic radical bound via an amino, methylamino or ethylamino group, such as, for example, a halogenotriazinyl or halogenopyrimidinyl radical, or aliphatic acylamino radicals, such as an halogenoacetylamino or halogenopropionylamino radical.

Examples of formula radicals $R^x$ and $R^z$ are: methyl, ethyl, propyl, isopropyl, butyl, isobutyl, sec.-butyl, tert.-butyl, carboxymethyl, $\beta$-carboxyethyl, $\beta$-carboxypropyl, methoxycarbonylmethyl, ethoxycarbonylmethyl, $\beta$-methoxyethyl, $\beta$-ethoxyethyl, $\beta$-methoxypropyl, $\beta$-chloroethyl, $\gamma$-bromopropyl, $\beta$-hydroxyethyl, $\beta$-hydroxybutyl, $\beta$-cyanoethyl, sulfomethyl, $\beta$-sulfoethyl, amidosulfonylmethyl and $\beta$-sulfatoethyl.

Of the 1:1 copper complex azo dyes according to the invention, those of the benzene and naphthalene series are preferred.

Preferred mono- and disazo dyes of the general formula (1) are, for example those of the general formulae (3a), (3b) and (3c)

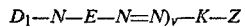  (3a)

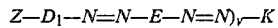  (3b)

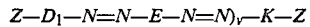  (3c)

and the metal complex compounds derived therefrom, such as 1:1 copper complex compounds, in which
$D_1$ is the radical of a diazo component of the benzene or naphthalene series,
E is the radical of a middle component of the benzene or naphthalene series,
K is the radical of a coupling component of the benzene, naphthalene, pyrazolone, 6-hydroxy-2-pyridone or arylacetoacetamide series,
in which $D_1$, E and K are substituents customary for azo dyes, such as, for example, hydroxyl, amino, methyl, methoxy, ethoxy, sulfo, carboxyl, substituted or unsubstituted alkanoylamino groups of 2 to 4 carbon atoms in the alkanoyl radical, substituted or unsubstituted benzoylamino groups and halogen atoms, such as bromine and chlorine atoms, and $D_1$, E and K together contain at least two sulfo groups, preferably three or four sulfo groups,
v is the number zero or 1, and
Z is a group of the formula (2).

Furthermore, preference is given to disazo dyes of the general formula (3d) or (3e)

$D_1-N=N-K^0-N=N-D_2-Z$  (3d)
$Z-D_1-N=N-K^0-N=N-D_2-Z$  (3e)

in which $D_1$ and $D_2$, independently of one another, are the radical of a diazo component of the benzene or naphthalene series and $K^0$ is the radical of a divalent coupling component of the naphthalene series, in which $D_1$, $D_2$ and $K^0$ can carry substituents customary for azo dyes, such as the ones already mentioned above, in which $D_1$, $D_2$ and $K^0$ together contain at least two sulfo groups, preferably three or four sulfo groups.

These azo dyes of the general formula (1) are in particular dyes of the general formulae (4a), (4b) and (4c)

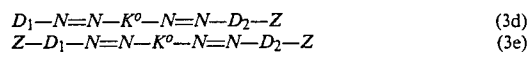

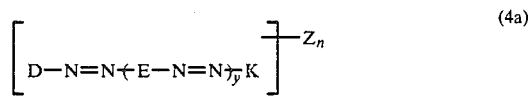

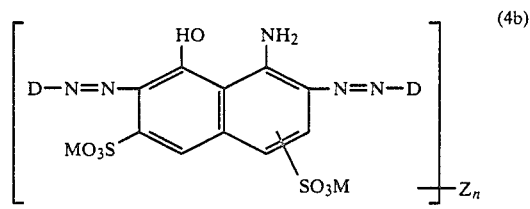

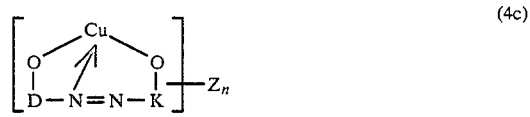

in which
D is in each case the radical of a diazo component which can have meanings which are identical to or different from one another, such as, for example, a radical $D_1$ of the abovementioned meaning,
E is the divalent radical of a couplable and diazotizable compound, for example of the abovementioned meaning,
K is the radical of a coupling component, for example of the abovementioned meaning,
v is the number zero or 1,
Z is a radical of the general formula (2)
n is the number 1 or 2, preferably 1, and the radical Z is bound to the radical D or the radical K or, where n is 2, is bound in each case to D and K or to both D, and
M is a hydrogen atom or an alkali metal, such as sodium, potassium or lithium.

The various possibilities of synthesizing the dyes according to the invention will be described later. One of these is the reaction of the corresponding starting diazo and coupling components by a coupling reaction.

Examples of these starting components are the following amino compounds, which can serve as diazo components: aminobenzene, 1-amino-2-, -3- or -4-methylbenzene, 1-amino-2-, -3- or -4-methoxybenzene, 1-amino-2-, -3- or -4-chlorobenzene, 1-amino-2,5- dichlorobenzene, 1-amino-2,5-dimethylbenzene, 1-amino-3-methyl-6-methoxybenzene, 1-amino-2-methoxy-4-nitrobenzene, 4-aminobiphenyl, 1-aminobenzene-2-, -3- or -4-carboxylic acid, 2-aminodiphenyl ether, 1-aminobenzene-2-, -3- or -4-sulfonamide, -N-methylamide, -N-ethylamide, -N,N-dimethylamide or -N,N-diethylamide, dehydrothio-p-toluidinesulfonic acid, 1-amino-4-trifluoromethyl-6-sulfonic acid, 1-amino-3- or -4-nitrobenzene, 1-amino-3- or -4-acetylaminobenzene, 1-aminobenzene-2-, -3- or -4-sulfonic acid, 1-aminobenzene-2,4- and -2,5-disulfonic acid, 1-amino-4-methylbenzene-2-sulfonic acid, 1-amino-3-methylbenzene-6-sulfonic acid, 1-amino-6-methylbenzene-3- or -4-sulfonic acid, 1-amino-2-carboxybenzene-4-sulfonic acid, 1-amino-4-carboxybenzene-2-sulfonic acid, 1-amino-4- or -5-chlorobenzene-2-sulfonic acid, 1-amino-6-chlorobenzene-3- or -4-sulfonic acid, 1-amino-3,4-dichlorobenzene-6-sulfonic acid, 1-amino-2,5-dichlorobenzene-6-sulfonic acid, 1-amino-2,5-dichlorobenzene-4-sulfonic acid, 1-amino-4-methyl-5-chlorobenzene-2-sulfonic acid, 1-amino-5-methyl-4-chlorobenzene-2-sulfonic acid, 1-amino-4- or -5-methoxybenzene-2-sulfonic acid, 1-amino-6-methoxybenzene-3- or -4-sulfonic acid, 1-amino-6-ethoxybenzene-3- or -4-sulfonic acid, 1-amino-2,4-dimethoxybenzene-6-sulfonic acid, 1-amino-2,5-dimethoxybenzene-4-sulfonic acid, 1-amino-3-acetylaminobenzene-6-sulfonic acid, 1-amino-4-acetylaminobenzene-2-sulfonic acid, 1-amino-3-acetylamino-4-methylbenzene-6-sulfonic acid, 2-amino-1-methylbenzene-3,5-disulfonic acid, 1-amino-4-methoxybenzene-2,5-disulfonic acid, 1-amino-3- or -4-nitrobenzene-6-sulfonic acid, 1-aminonaphthalene, 2-aminonaphthalene, 1-aminonaphthalene-2-, -4-, -5-, -6-, -7- or -8-sulfonic acid, 2-aminonaphthalene-1-, -3-, -4-, -5-, -6-, -7- or 8-sulfonic acid, 1-aminonaphthalene-3,6- or -5,7-disulfonic acid, 2-aminonaphthalene-1,5- -1,7-, -3,6-, -5,7-, -4,8, or -6,8-disulfonic acid, 1-aminonaphthalene-2,5,7-trisulfonic acid, 2-aminonaphthalene-1,5,7-, -3,6,8- or -4,6,8-trisulfonic acid, 1-hydroxy-2-aminobenzene-4-sulfonic acid, 1-hydroxy-2-aminobenzene-5-sulfonic acid, 1-hydroxy-2-aminobenzene-4,6-disulfonic acid, 1-hydroxy-2-amino-4-acetylaminobenzene-6-sulfonic acid, 1-hydroxy-2-amino-6-acetylaminobenzene-4-sulfonic acid, 1-hydroxy-2-amino-4-chlorobenzene-5-sulfonic acid, 1-hydroxy-2-amino-4-methylsulfonylbenzene, 1-amino-2-hydroxy-6-nitronaphthalene-4-sulfonic acid, 2-amino-1-hydroxynaphthalene-4,8-disulfonic acid, 4-aminobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1,3-diaminobenzene,1,4-diaminobenzene,1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene,1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene,2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'dicarboxybenzidine,3,3'-dicarboxymethoxybenzidine,2,2'-dimethylbenzidine, 4,2,-diaminodiphenyl (diphenylene), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'-amino-benzoylamino)-1-aminobenzene-6-sulfonic acid, 3-(4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid,1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl oxide, 4,4'-diaminodiphenylurea-2,2'-disulfonic acid, 4,4,-diaminodiphenyl-oxyethane-2,2'-disulfonic acid, 4,4'-diaminostilbene-2,2'-disulfonic acid, 4,4'-diaminodiphenylethane-2,2'-disulfonic acid, 2-amino-5-aminomethylnaphthalene-1-sulfonic acid, 2-amino-5-aminomethylnaphthalene-1,7-disulfonic acid, 1-amino-4-methoxy-5-aminomethylbenzene-6-sulfonic acid, 2-($\beta$-sulfatoethylsulfonyl)phenylaniline, 3-($\beta$-sulfatoethylsulfonyl)aniline, 4-($\beta$-sulfatoethylsulfonyl)aniline, 2-carboxy-5-($\beta$-sulfatoethylsulfonyl)aniline, 2-chloro-3-($\beta$-sulfatoethylsulfonyl)aniline, 2-chloro-4-($\beta$-sulfatoethylsulfonyl)aniline, 2-ethoxy-4- or -5-($\beta$-sulfatoethylsulfonyl)aniline, 2-ethyl-4-($\beta$-sulfatoethylsulfonyl)aniline, 2-methoxy-5-($\beta$-sulfatoethylsulfonyl)aniline, 2,4-diethoxy-5-$\beta$-sulfatoethylsulfonyl)aniline, 2,4-dimethoxy-5-($\beta$-sulfatoethylsulfonyl)aniline, 2,5-dimethoxy-4-($\beta$-sulfatoethylsulfonyl)aniline, 2-methoxy-5-methyl-4-($\beta$-sulfatoethylsulfonyl)aniline, 2- or 3- or 4-($\beta$-thiosulfatoethylsulfonyl)aniline, 2-methoxy-5-($\beta$-thiosulfatoethylsulfonyl)aniline, 2-sulfo-4-($\beta$-phosphatoethylsulfonyl)aniline, 2-sulfo-4-vinylsulfonylaniline, 2-hydroxy-4- or -5-($\beta$-sulfatoethylsulfonyl)aniline, 2-chloro-4- or -5-($\beta$-chloroethylsulfonyl)aniline, 2-hydroxy-3-sulfo-5-($\beta$-sulfatoethylsulfonyl)aniline, 3- or 4-($\beta$-acetoxyethylsulfonyl)aniline, 2-methoxy-4-[$\beta$-(N-methyltauryl)ethylsulfonyl]aniline, 5-($\beta$-sulfatoethylsulfonyl)-2-aminonaphthalene, 6- or 7- or 8-($\beta$-sulfatoethylsulfonyl)-2-aminonaphthalene, 6-($\beta$-sulfatoethylsulfonyl)-1-sulfo-2-aminonaphthalene, 5-($\beta$-sulfatoethylsulfonyl)-1-sulfo-2-aminonaphthalene, 8-($\beta$-sulfatoethylsulfonyl)-6-sulfo-2-aminonaphthalene.

If in the synthesis according to the invention the diazo component used is an aminoacetyl compound instead of a diamine, from which afterwards the acetyl group is again cleaved off by hydrolysis, it is possible to use the monoacetyl compounds of the abovementioned diazo components, such as, for example, 1-acetylamino-3-amino-benzene-4-sulfonic acid and 1-acetylamino-4-aminobenzene-3-sulfonic acid.

Examples of coupling components which can serve for the synthesis of the azo dyes according to the invention are: phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea,1-amino-3-acetylaminobenzene, 1-amino-3-hydroxyacetylaminobenzene, 1,3-diaminobenzene-4-sulfonic acid, 1-aminonaphthalene-6- or -8-sulfonic acid, 1-amino-2-methoxynaphthalene-6-sulfonic acid, 2-aminonaphthalene-5,7-disulfonic acid, 1-amino-8-hydroxynapthalene-4-sulfonic acid, 1-amino-8-hydroxynaphthalene-6sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methylamino- or 2-ethylamino-8-hydroxynaphthalene-6-sulfonic acid, 2-N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-disulfonic acid, 1-acetylamino-8-hydroxynaphthalene-3,6- or -4,6-disulfonic acid, 1-(4'-aminobenzoylamino)-8-hydroxynaphthalene-3,6- or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 3-methyl-5-pyrazalone, 1-phenyl-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfonaphthyl-[8'])-3-methyl-5-pryazolone, 1-(5',7'-disulfonaphthyl-[2'])-methyl-5-pyrazolone, 1-(2',5'-dichloro-4'-sulfophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis(2'-hydroxyethylamino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenzene-5-sulfonic acid, 4-hydroxyquinol-2-one, 1-amino-8-hyroxy-2-(phenylazo)naphthalene-3,6-disulfonic acid, 1-amino-8-hydroxy-2-(4'-sulfophenylazo)naphthalene-3,6-disulfonic acid, 1-amino-8-hydroxy-2-(2',5'-disulfophenylazo)-naphthalene-3,6-disulfonic acid, 1-(β-aminoethyl)-3-cyano-4-methyl-6-hydroxy-2-pyridone, 1-(γ-aminopropyl)-3-sulfomethyl-4-methyl-6-hydroxy-2-pyridone, 1,3-diaminobenzene, 1-amino-3-N,N-di-(β-hydroxyethyl)aminobenzene, 1-amino-3,N,N-di-(β-sulfatoethyl)aminobenzene, 1-amino-3-N,N-di(β-hydroxyethyl)amino-4-methoxybenzene, 1-amino-3,N,N-di-(β-sulfatoethyl)amino-4-methoxybenzene, 1-amino-3-sulfobenzylaminobenzene, 1-amino-3-sulfobenzylamino-4-chlorobenzene, 1-amino-3-N,N-di-(sulfobenzyl)aminobenzene, 2-(4-β-sulfatoethylsulfonylphenyl)-3-methyl-5-pyrazolone and 1-(4-β-sulfatoethylsulfonylphenyl)-3-carboxy-5-pyrazolone.

Aromatic radicals D or $D_1$ of the diazo components D—$NH_2$ or $D_1$—$NH_1$ which do not carry any fiber-reactive group of the general formula (3) are, for example, those of the amines of the general formulae (5a) and (5b)

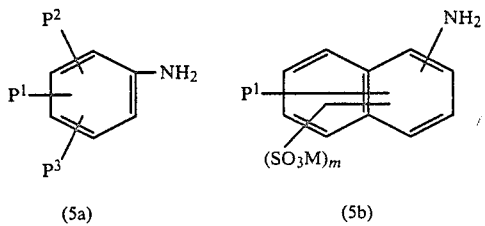

(5a)   (5b)

in which
$P^1$ is hydrogen, sulfo or a group of the general formula —$SO_2$—Y where Y has the abovementioned meaning,
$p^2$ is hydrogen, methyl, ethyl, methoxy, ethoxy, alkanoyl of 2 to 5 carbon atoms, such as acetyl and propionyl, cyano, carboxyl, sulfo, alkoxycarbonyl of 2 to 5 carbon atoms, carbamoyl, N-($C_1$-$C_4$-alkyl)-carbamoyl, fluorine, chlorine, bromine or trifluoromethyl,
$p^3$ is hydrogen, methyl, ethyl, methoxy, ethoxy, cyano, carboxyl, sulfo, alkanoylamino of 2 to 5 carbon atoms, such as acetylamino, alkoxycarbonyl of 2 to 5 carbon atoms, carbamoyl, N-($C_1$-$C_4$-alkyl)carbamoyl, fluorine, chlorine, nitro, sulfamoyl, N-($C_1$-$C_4$-alkyl)sulfamoyl, alkylsulfonyl of 1 to 4 carbon atoms, phenylsulfonyl or phenoxy,
in which the benzene ring in formulae (5a) and (5b) can additionally contain a hydroxyl group in the ortho position relative to the amino group,
m is the number zero, 1 or 2, (in which this group, in the case where p is zero, is a hydrogen atom) and
M has the abovementioned meaning.
Of these, $P^2$ is preferably hydrogen, methyl, methoxy, bromine, chlorine, carboxyl and sulfo and $P^3$ is hydrogen, methyl, methoxy, chlorine, carboxyl, sulfo and acetylamino.

The groups "sulfo", "carboxyl", "phosphato", "thiosulfato" and "sulfato" include not only their acid form but also their salt form. Accordingly, sulfo groups are groups corresponding to the general formula —$SO_3M$, carboxyl groups are groups corresponding to the general formula —COOM, phosphato groups are groups corresponding to the general formula —$OPO_3M_2$, thiosulfato groups are groups corresponding to the general formula —S—$SO_3M$ and sulfato groups are groups corresponding to the general formula —$OSO_3M$, where M has in each case the abovementioned meaning.

Examples of aromatic amines of the general formula D—$NH_2$ in accordance with formulae (5a) and (5b) are: 2-amino or 4-aminobenzoic acid, 3-aminobenzoic acid, 3-chloroaniline-6-carboxylic acid, aniline-2- or -3- or -4-sulfonic acid, 2,5-disulfoaniline, 2,4-disulfoaniline, 3,5-disulfoaniline, 2-aminotoluene-4-sulfonic acid, 2-aminoanisole-5-sulfonic acid, 2-aminoanisole-5-sulfonic acid, 4-aminoanisole-2-sulfonic acid, 2-ethoxyaniline-5-sulfonic acid, 2-ethoxyaniline-4-sulfonic acid, 4-sulfo-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3-sulfonic acid or -4-sulfonic acid, 3-acetylamino-6-sulfoaniline, 4-acetylamino-2-sulfoaniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acid, 1-amino-naphthalene-4,6,8-trisulfonic acid, 2-naphthylamino-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 4-($\beta$-sulfatoethylsulfonyl)aniline, 3-($\beta$-sulfatoethylsulfonyl)aniline, 2-sulfo-5-($\beta$-sulfatoethylsulfonyl)aniline, 2-sulfo-4-($\beta$-sulfatoethylsulfonyl)aniline, 2-methoxy-5-($\beta$-sulfatoethylsulfonyl)aniline, 2-methoxy-5-methyl-4-($\beta$-sulfatoethylsulfonyl)aniline, 2,5-dimethoxy-4-($\beta$-sulfatoethylsulfonyl)aniline, 2-amino-5-($\beta$-sulfatoethylsulfonyl)phenol, 2-amino-4-($\beta$-sulfatoethylsulfonyl)phenol, 2-amino-6-($\beta$-sulfatoethylsulfonyl)-naphthalene-8-sulfonic acid, 2-amino-8-($\beta$-sulfatoethylsulfonyl)naphthalene-6-sulfonic acid, 2-amino-5-($\beta$-sulfatoethylsulfonyl)naphthalene-7-sulfonic acid and 2-amino-7-($\beta$-sulfatoethylsulfonyl)naphthalene-5-sulfonic acid.

Aromatic amines of the diazo component Z—D—$NH_2$ or Z—$D_1$—$NH_2$ containing the fiber-reactive radical Z are preferably derived from aromatic amines of the general formulae (6a) and (6b)

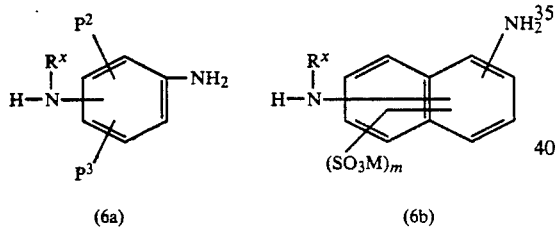

(6a)          (6b)

in which $R^x$, M, m, $P^2$ and $P^3$ have the abovementioned, in particular the preferred meanings, it being possible for the benzene ring in formulae (6a) and (6b) to contain additionally a hydroxyl group in the ortho position relative to the amino group —$NH_2$.

Examples of amines of the general formulae (6) are: 1,3-diaminobenzene, 1,3-diaminobenzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,5-diamino-4-methylbenzene-2-sulfonic acid, 1,5-diamino-4-methoxybenzene-2-sulfonic acid, 1,3-diaminobenzene-5-sulfonic acid, 1,3-diamino-5-methylbenzene, 2,6-diaminonaphthalene, 2,6-diaminonaphthalene-4,8-disulfonic acid, 2-amino-5-methylaminonaphthalene-1-sulfonic acid, 2-amino-5-methylaminonaphthalene-1,7-disulfonic acid and 1,4-diaminonaphthalene-6-sulfonic acid.

Preferred radicals D, $D_1$ or $D_2$ with or without the radical Z are in formulae (3a) to (3e), (4a) and (4b) those of the general formulae (5c) and (5d) or (5g) and in formula (4c) those of the general formulae (5e) and (5f) or (5h):

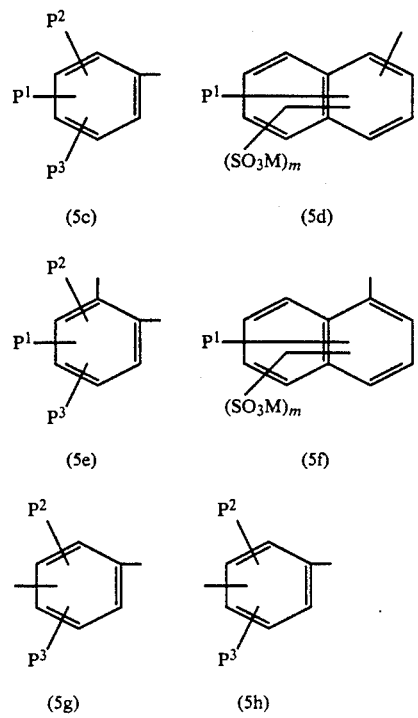

in which $P^1$, $P^2$, $P^3$, m and M have the abovementioned meanings.

Aromatic radicals E of a couplable and diazotizable compound of the general formula H—E—$NH_2$ are, for example, those of the general formulae (7a), (7b) and (7c)

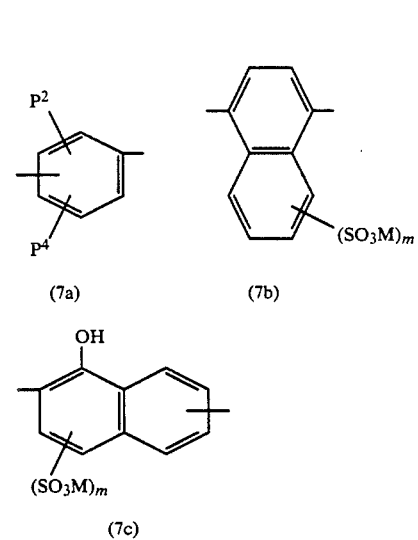

in which
$p^2$ and M have the abovementioned meanings,
$p^4$ is hydrogen, alkyl of 1 to 4 carbon atoms, such as methyl or ethyl, alkoxy of 1 to 4 carbon atoms, such as methoxy or ethoxy, chlorine, alkanoylamino of 2 to 5 carbon atoms, such as acetylamino and propionylamino, benzoylamino, ureido, phenylureido, alkylureido of 1 to 4 carbon atoms in the alkyl radical, phenylsulfonyl or alkylsulfonyl of 1 to 4 carbon atoms and
m is the number zero, 1 or 2, (in which this group, in the case where p is zero, is a hydrogen atom).

Examples of these compounds are: aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1-aminonaphthalene, 1-aminonaphthalene-6- or -7- or -8-sulfonic acid, 3-acetylaminoaniline, 2-methylaniline, 2-methoxyaniline, 3-benzoylaminoaniline, 2,3-dimethylaniline, 3,5-dimethylaniline, 1-amino-2-methoxy-5-acetylaminobenzene, 3-propionylaminoaniline, 3-butyrylaminoaniline, 2-sulfo-5-acetylaminoaniline, 2-amino-5-naphthol-7-sulfonic acid and 2-amino-8-naphthol-6-sulfonic acid.

The radicals K of the coupling component preferably come from the aniline, naphthalene, pyrazole and acylacetarylide series; they can contain fiber-reactive groups.

Examples of coupling components of the formula H-K of the aniline and naphthalene series are anilines, N-mono- and N,N-disubstituted anilines, m-phenylenediamines and their derivatives, naphtholsulfonic acids, aminonaphthalenes, naphthols, hydroxylnaphthoic acid derivatives, aminonaphthalenesulfonic acids or aminonaphtholsulfonic acids.

Coupling components of the formula H-K which do not carry any fiber-reactive group of the general formula (2) are, for example, compounds of the general formulae (8a) to (8g)

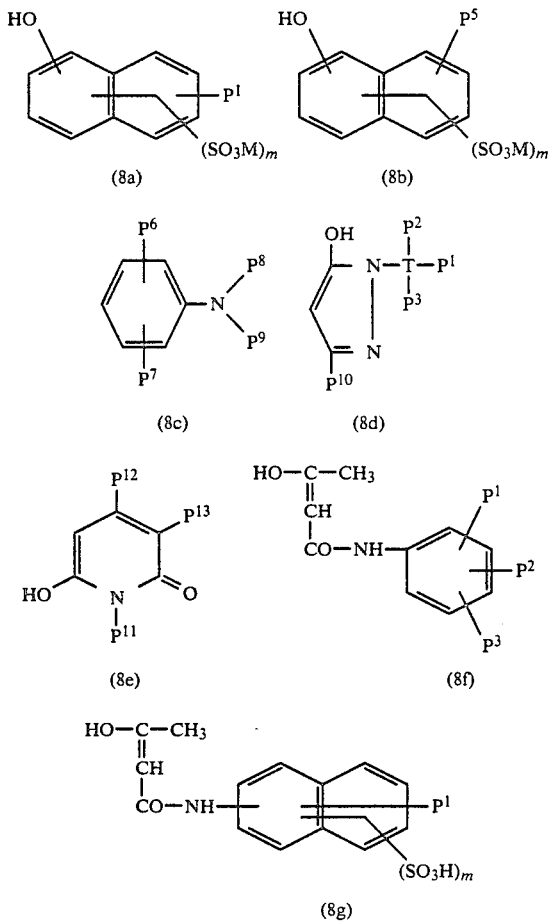

in which
$P^1$, $P^2$, $P^3$, m and M have the abovementioned meanings, $P^5$ is alkylureido containing alkyl groups of 1 to 6 carbon atoms, phenylureido, phenylureido which is substituted in the phenyl radical by chlorine, methyl, methoxy, nitro, sulfo and/or carboxyl and/or a group —$SO_2Y$ where Y has the abovementioned meaning, alkanoylamino of 2 to 7 carbon atoms, such as, for example, acetylamino and propionylamino, cyclohexanoylamino, benzoylamino or benzoylamino which is substituted in the benzene ring by chlorine, methyl, methoxy, nitro, sulfo and/or carboxyl and/or a group —$SO_2$—Y where Y has the abovementioned meaning, $P^6$ is hydrogen, alkyl of 1 to 4 carbon atoms, such as methyl and ethyl, alkoxy of 1 to 4 carbon atoms, such as methoxy and ethoxy, bromine, chlorine or alkanoylamino of 2 to 7 carbon atoms, such as acetylamino and propionylamino, $P^7$ is hydrogen, alkyl of 1 to 4 carbon atoms, such as methyl and ethyl, alkoxy of 1 to 4 carbon atoms, such as methoxy and ethoxy, chlorine, alkanoylamino of 2 to 7 carbon atoms, such as acetylamino and propionylamino, ureido or phenylureido, $P^8$ is hydrogen or alkyl of 1 to 4 carbon atoms, which can be substituted by hydroxyl, cyano, carboxyl, sulfo, sulfato, methoxycarbonyl, ethoxycarbonyl or acetoxy, $P^9$ is alkyl of 1 to 4 carbon atoms, which can be substituted by hydroxyl, cyano, carboxyl, sulfo, sulfato, methoxycarbonyl, ethoxycarbonyl or acetoxy, or is benzyl or phenyl or phenyl which is substituted by alkyl of 1 to 4 carbon atoms, alkoxy of 1 to 4 carbon atoms, chlorine and/or sulfo, $P^{10}$ is hydrogen, alkyl of 1 to 4 carbon atoms, such as methyl, cyano, carboxyl, carbalkoxy of 2 to 5 carbon atoms, such as carbomethoxy and carbethoxy, carbamoyl or phenyl, preferably methyl, carboxyl, methoxycarbonyl, ethoxycarbonyl or phenyl and in particular methyl or carboxyl, T is a benzene or naphthalene ring, preferably a benzene ring, $P^{11}$ is hydrogen, alkyl of 1 to 6 carbon atoms, preferably 1 to 4 carbon atoms, which can be substituted by phenyl or sulfophenyl or by hydroxyl, amino, methoxy, ethoxy, carboxyl, sulfo, acetylamino, benzoylamino or cyano, or is cyclohexyl, phenyl or phenyl which is substituted by carboxyl, sulfo, benzoylamino, acetylamino, methyl, methoxy, cyano and/or chlorine, and is preferably hydrogen or alkyl of 1 to 4 carbon atoms, which can be substituted by phenyl, sulfo or sulfophenyl, $P^{12}$ is hydrogen or alkyl of 1 to 4 carbon atoms, such as methyl, or is alkyl of 1 to 4 carbon atoms substituted by alkoxy of 1 to 4 carbon atoms, such as methoxy, or cyano, preferably alkyl of 1 to 4 carbon atoms or phenyl, and $P^{13}$ is hydrogen, chlorine, bromine, sulfo, carbamoyl, methylsulfonyl, phenylsulfonyl, cyano or sulfoalkyl of 1 to 4 carbon atoms, preferably hydrogen, sulfo or sulfoalkyl containing an alkyl radical of 1 to 4 carbon atoms, such as sulfomethyl, or is cyano or carbamoyl.

Examples of compounds of the general formulae (8) are: 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-5-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid, 1-benzoylamino-8-hydroxynaphthalene-4,6-disulfonic acid, 2-acetylamino-5-hydroxynaphthalene-7-sulfonic acid, 3-acetylamino-5-hydroxynaphthalene-7-sulfonic acid, 2-methylamino-8-hydroxynaphthalene-6-sulfonic acid or 2-(3'- and 4'-sulfophenyl-)amino-8-hydroxynaphthalene-6-sulfonic acid, 3-(3'- and 4'-sulfophenyl)amino-8-hydroxynaphthalene-6-sulfonic acid, N,N-di-(β-sulfoethyl)aniline and its derivatives which are mono- or disubstituted in the benzene ring by methyl, methoxy and/or ethoxy N-ethyl-N-(β-sulfoethyl)aniline, N-(β-sulfoethyl)aniline, N-(β-carboxyethyl)aniline and its derivatives which are mono- or disubstituted in the benzene ring by methyl, methoxy and/or ethoxy, furthermore 1-[3'-(β-chloroethylsulfonyl)benzoylamino]-3,6-disulfo-8-naphthol, 1-[3'-(vinylsulfonyl)benzoylamino]-3,6-disulfo-8-naphthol, 1-[3'-vinylsulfonyl)benzoylamino]-4,6-disulfo-8-naphthol, 1-[3'-(β-sulfatoethylsulfonyl)benzoylamino]-4,6-disulfo-8-naphthol, 2-[3'-(β-chloroethylsulfonyl)benzoylamino)benzoylamino]-6-sulfo-8-naphthol, 2-[3'-(vinylsulfonyl)benzoylamino]-6-sulfo-8-naphthol, 3-[3'-(β-chloroethylsulfonyl)benzoylamino]-6-sulfo-8-naphthol, 3-[3'-(vinylsulfonyl)benzoylamino]-6-sulfo-8-naphthol, 2-[N-methyl-N-(β-sulfatoethylsulfonyl)amino]-6-sulfo-8-naphthol, 3-[N-methyl-N-(β-sulfatoethylsulfonyl)amino]-6-sulfo-8-naphthol, 2-[N-ethyl-N-(β-sulfatoethylsulfonyl)amino]-6-sulfo-8-naphthol, 1-[N'-(3'-β-chloroethylsulfonylphenyl)ureido]-3,6-disulfo-8-naphthol, 1-[N'-(3'-vinylsulfonylphenyl)-ureido]-3,6-disulfo-8-naphthol, 1-[N'-(3'-vinylsulfonylpropyl-)ureido]-3,6-disulfo-8-naphthol, 1-[N'-3(3'-β-chloroethylsulfonylphenyl)ureido]-4,6-disulfo-8-naphthol, 1-[N'-(3'-vinylsulfonylphenyl)ureido]-4,6-disulfo-8-naphthol, 1-[N'-(3'-β-chloroethylsulfonylpropyl)ureido]-4,6-disulfo-8-naphthol, 2-[N'-(3'-β-sulfatoethylsulfonylphenyl)ureido]-6-sulfo-8-naphthol, 2-[N'-(3'-β-chloroethylsulfonylpropyl)ureido]-6-sulfo-8-naphthol, 3-[N'-(3'-β-chloroethylsulfonylphenyl)ureido]-6sulfo-8-naphthol and 3-[N'-(3'-vinylsulfonylpropyl)ureido]-6-sulfo-8-naphthol.

Of these, sulfo-containing coupling components, which may carry azo groups, such as 1 or 2 azo groups, and which couple in the o- or p-position relative to the hydroxyl and/or amino group, such as, for example, 2-acetylamino-5-hydroxynaphthalene-7-sulfonic acid, 2-acetylamino-8-hydroxynaphthalene-6-sulfonic acid, 1-acetylamino-8-hydroxynapthalene-3,6-disulfonic acid, 1-benzoylamino-8-hydroxynaphthalene-3,6-disulfonic acid, 1-acetylamino-8-hydroxynapthalene-4,6-disulfonic acid or 1-benzoylamino-8-hydroxynaphthalene-4,6-disulfonic acid are particularly important.

Pyrazolone coupling components are, for example, 3-methyl-, 3-carboxy- and 3-($C_2$–$C_5$-alkoxycarbonyl)-5-pyrazolones, which carry hydrogen, phenyl which is unsubstituted or substituted by methyl, ethyl, fluorine, chlorine, bromine, trifluoromethyl, methoxy, ethoxy, cyano, phenoxy, phenylsulfonyl, methylsulfonyl, sulfo, benzoyl, acetyl, acetylamino, nitro, hydroxyl, carboxyl, carbamoyl and/or sulfamoyl or sulfo-substituted 1- or 2-naphthyl in the 1-position, for example: 1-(2'-methoxy-5'-methylphenyl)-, 1-(2,-chloro-5'-sulfophenyl)-, 1-(2'-methoxy-5'-sulfophenyl)-, 1-(2'-methyl-4'-sulfophenyl)-, 1-(2',5'-dichloro-4'-sulfophenyl)-, 1-(4'-sulfophenyl)-, 1-(3'-sulfamoylphenyl)-3-carboxy-5-pyrazolone, 1-(3'- or 4'-sulfophenyl-)-, 1-(2'-chloro-4'- or -5'-sulfophenyl)-, 1-(2'-methyl-4'-sulfophenyl)-, 1-(4',8'-disulfo-2'-naphthyl)- and 1-(6'-sulfo-1'-naphthyl)-3-methyl-5-pyrazolone, ethyl 1-phenyl-5-pyrazolone-3-carboxylate, ethyl 5-pyrazolone-3-carboxylate, 5-pyrazolone-3-carboxylic acid, 1-[4'-(β-sulfatoethylsulfonyl)-2'-sulfo]phenyl-3-methylpyrazol-5-one, 1-[4'-(β-sulfatoethylsulfonyl)]phenyl-3-carboxypyrazol-5-one, 1-[4'-(β-sulfatoethylsulfonyl)]phenyl-3-methylpyrazol-5-one, 1-[3'-(β-sulfatoethylsulfonyl)]phenyl-3-carboxylpyrazol-5-one, 1-[3'-(β-sulfatoethylsulfonyl)]phenyl-3-methyl-pyrazol-5-one, and 1-4'-sulfophenyl)-3-carboxypyrazol-5-one.

Examples of pyridone coupling components are 1-ethyl-2-hydroxy-4-methyl-5-carboxamido-6-pyridone, 1-(2'-hydroxyethyl)-2-hydroxy-4-methyl-5-carboxamido-6-pyridone, 1-(4'-sulfophenyl)-2-hydroxy-4-methyl-5-carboxamido-6-pyridone, 1-(2'-sulfoethyl)-2-hydroxy-4-methyl-5-cyano-6-pyridone, 1-ethyl-2-hydroxy-4-sulfomethyl-5-carboxamido-6-pyridone, 1-ethyl-2-hydroxy-4-methyl-5-sulfomethyl-6-pyridone, 1-methyl-2-hydroxy-4-methyl-5-cyano-6-pyridone, 1-methyl-2-hydroxy-5-acetyl-6-pyridone, 1,4-dimethyl-2-hydroxy-5-cyano-6-pyridone, 1,4-dimethyl-2-hydroxy-5-carbamoyl-6-pyridone, 2,6-dihydroxy-4-ethyl-5-cyanopyridine, 2,6-dihydroxy-4-ethyl-5-carbamoylpyridine, 1-ethyl-2-hydroxy-4-methyl-5-sulfomethyl-6-pyridone, 1-methyl-2-hydroxy-4-methyl-5-methylsulfonyl-6-pyridone, 1-methyl-2-hydroxy-4-methyl-5-methylsulfonyl-6-pyridone, 1-carboxymethyl-2-hydroxy-4-ethyl-5-phenylsulfonyl-6-pyridone and and 1-(2'-sulfoethyl)-2-hydroxy-4-carboxy-6-pyridone and acetoacetylarylamide coupling components are, for example, acetoacetyl-(2-methoxy-4-sulfo-5-methyl)aniline, acetoacetyl-(2,4-dimethoxy-5-methyl)aniline and acetoacetyl-(4-β-sulfatoethylsulfonyl)aniline.

Suitable coupling components H-K are furthermore in particular: 1-amino-8-hydroxynaphthalene-3,6- and -4,6-disulfonic acid and their aryl azo coupling products obtained by acid coupling of the formula (9a)

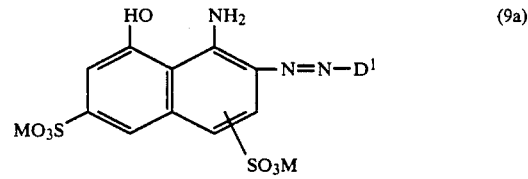

in which $D^1$ is the radical of a diazo component, for example a radical of the formula (10a) or (10b)

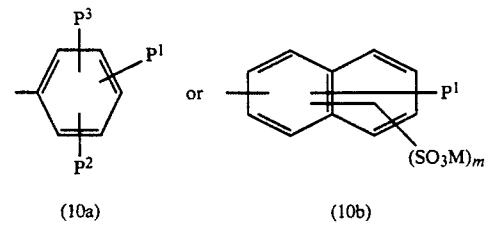

(10a)  (10b)

in which $P^1$, $P^2$, $P^3$, M and m have the abovementioned meanings.

Examples of individual radicals $D^1$ are: phenyl, 2-sulfophenyl, 3-sulfophenyl, 4-sulfophenyl, 2,4-disulfophenyl, 2,5-disulfophenyl, 3,5-disulfophenyl, 1,5-disulfonaphth-2-yl, 4,8-disulfonaphth-2-yl, 3,6,8-trisulfonaphth-2-yl, 4,6,8-trisulfonaphth-2-yl, 3,6,8-trisulfonaphth-1-yl, 4,6,8-trisulfonaphth-1-yl, 4-sulfonaphth-1-yl, 1-sulfonaphth-2-yl, 3-acetylaminophenyl, 4-acetylaminophenyl, 4-acetylamino-2-sulfophenyl, 5-acetylamino-2-sulfophenyl, 4-nitrophenyl, 4-nitro-2-sulfophenyl, 6-acetylamino-4,8-disulfonaphth-2-yl, 4-($\beta$-sulfatoethylsulfonyl)phenyl and 3-($\beta$-sulfatoethylsulfonyl)phenyl.

Coupling components which, according to the invention, contain the fiber-reactive group of the formula (2) or into which the fiber-reactive group, if desired after the coupling reaction, can be introduced, are, for example, compounds of the general formulae (11a) to (11h) or their $Z^1$-free precursors (i.e. compounds which contain the group $-N(R^x)-H$ instead of the group $-N(R^x)-Z^1$:

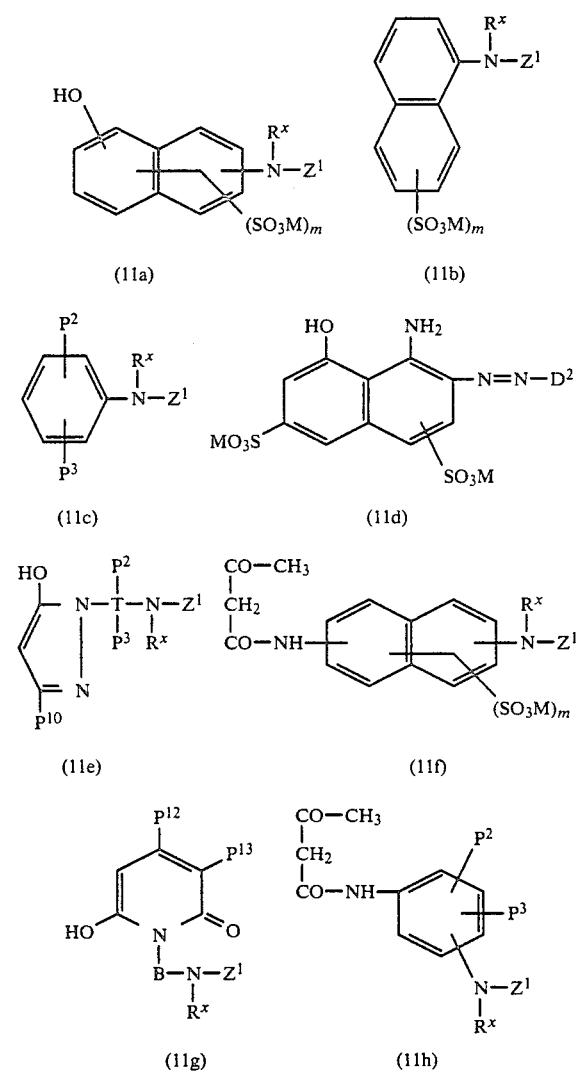

in which
$R^x$, $P^2$, $P^3$, $P^{10}$, $P^{12}$, $P^{13}$, $D^2$, M, m and T have the abovementioned, in particular the preferred meanings,
B is alkyl of 1 to 4 carbon atoms, benzyl, phenethyl or phenyl, unsubstituted or each substituted in the benzene radical by fluorine, chlorine, bromine, methyl, methoxy, cyano, sulfo, carboxyl, acetyl, nitro, carbamoyl and/or sulfamoyl, and in which in the case of "benzyl" and "phenethyl" the group $-N(R^x)-Z^1$ is bound to the benzene ring, $Z^1$ is a radical of the general formula (2A)

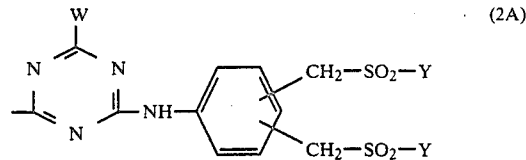

where W and Y have the abovementioned meaning, $D^2$ is the radical of a diazo component having a fiber-reactive group, in particular of the formula (2), preferably a radical of the abovementioned formula (10a) or (10b) where $P^1$ is a group of the formula $-SO_2-Y$ or a radical of the formula (10c)

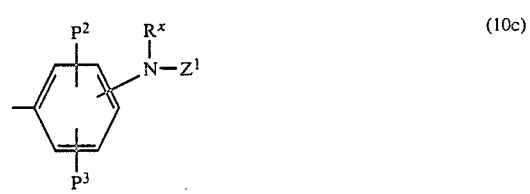

in which $R^x$, $P^2$, $P^3$ and $Z^1$ have the abovementioned, in particular the preferred meanings.

Examples of aromatic diamines comprising the radical of the formula (10c) are: 1,3-diaminobenzene, 1,3-diamino-benzene-4-sulfonic acid, 1,3-diaminobenzene-4,6-disulfonic acid, 1,4-diaminobenzene, 1,4-diaminobenzene-2-sulfonic acid, 1,4-diaminobenzene-2,5-disulfonic acid, 1,4-diamino-2-methylbenzene, 1,4-diamino-2-methoxybenzene, 1,3-diamino-4-methylbenzene, 1,4-diaminobenzene-2,6-disulfonic acid, 1,5-diamino-4-methylbenzene-2-sulfonic acid, 1,5-diamino-4-methoxybenzene-2-sulfonic acid, it being possible for a primary or secondary amino group in all these diamino compounds to be substituted by the fiber-reactive radical $Z^1$.

The compounds of the general formulae (11b) and (11c) themselves cannot be used as coupling components. The coupling components which serve for the synthesis of the azo dyes according to the invention are their $Z^1$-free precursors, i.e. their precursors which contain an amino group of the formula $-N(R^x)-H$ instead of the group $-N(R^x)-Z^1$. After these amino-containing precursors are coupled with a suitable diazo component to give the azo compound, the fiber-reactive radical $Z^1$ can be incorporated in the amino group $-N(R^x)-H$ by reaction with a compound of the general formula Hal—$Z^1$, in which Hal is a halogen atom, preferably a fluorine or chlorine atom, and $Z^1$ has the abovementioned meaning. Analogously, the $Z^1$-free amino compounds of the compounds of the general formulae (11a) and (11b) to (11h) themselves can also first serve as coupling components for preparing an aminoazo starting compound, in which the fiber-reactive radical is then incorporated in the same manner. The coupling components themselves which contain the fiber-reactive radical $Z^1$ of the general formulae (11a) and (11d) to (11h) can likewise be prepared by reaction of these $Z^1$-free, amino-containing starting compounds with a compound of the formula Hal-$Z^1$ analogously to known procedures.

Instead of the radical $Z^1$, it is also possible to incorporate other known fiber-reactive radicals in the amino groups of the amino-containing coupling components or their aminoazo starting compounds, if it is desired to prepare the type of azo dyes according to the invention in which the diazo component contains the fiber-reactive grouping Z according to the invention. In principle, all known fiber-reactive acylating agents can be used for this purpose.

Radicals K in the general formulae (3b) and (4b) which do not contain the group Z are in particular radicals of the general formulae (12a) to (12h)

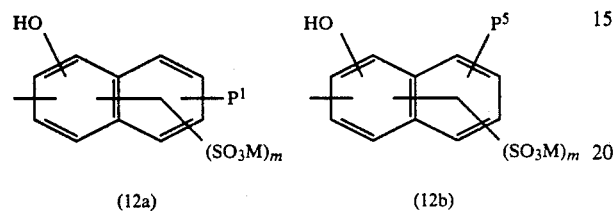

(12a)   (12b)

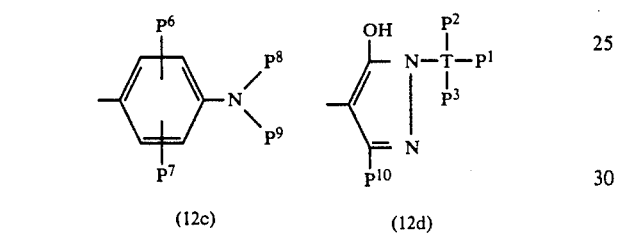

(12c)   (12d)

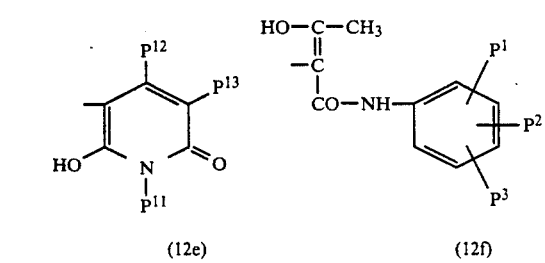

(12e)   (12f)

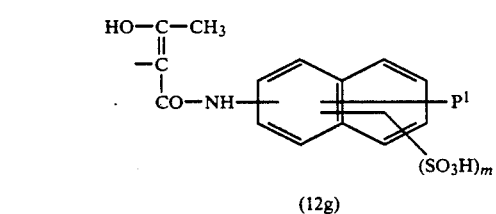

(12g)

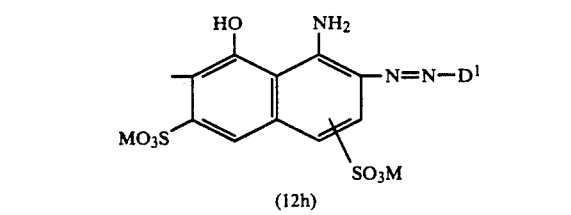

(12h)

in which the individual formula members have the abovementioned meanings.

Radicals K in the general formulae (3a), (3c) and (4a) which contain the group Z are in particular radicals of the general formulae (12j) to (12p)

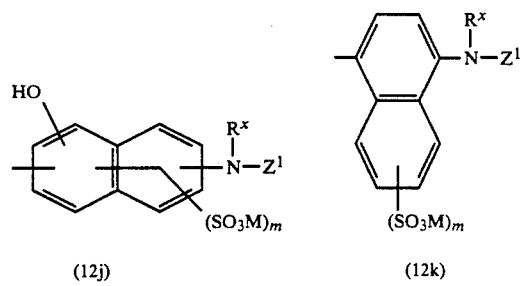

(12j)   (12k)

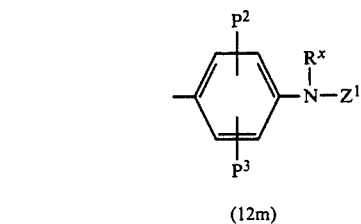

(12m)

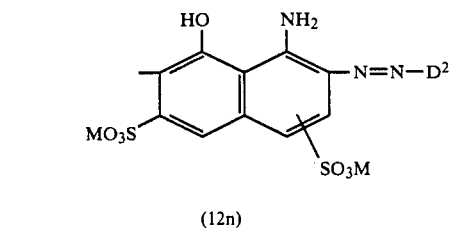

(12n)

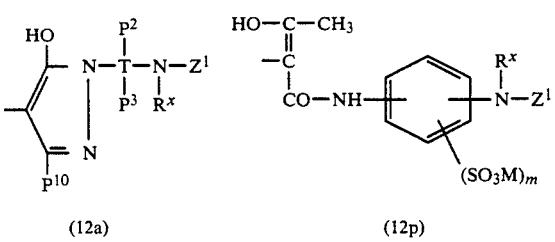

(12a)   (12p)

in which the individual formula members have the abovementioned meanings.

Radicals K in the general formula (4c) which contain an oxygen atom which binds to a metal complex, and which may contain the group Z are in particular those of the formulae (13a) to (13f)

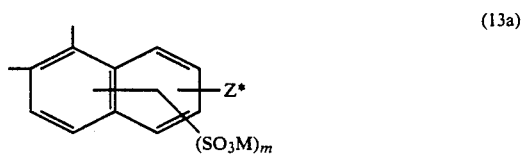

(13a)

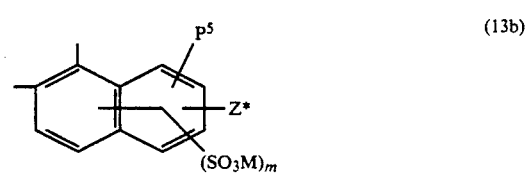

(13b)

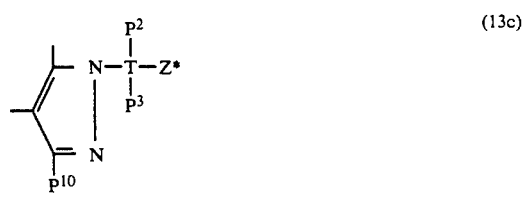

(13c)

-continued

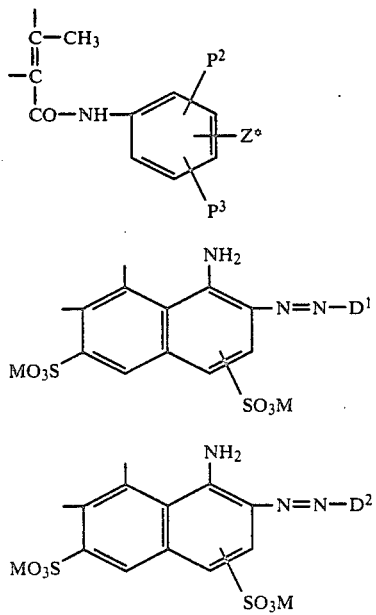

(13d)

(13e)

(13f)

in which $Z^*$ has one of the meanings of $P^1$ or Z and in which the individual formula members have one of the abovementioned meanings.

Of the anthraquinone dyes according to the invention, those are preferred which have the general formula (14)

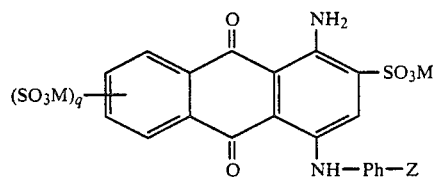
(14)

in which
M is a hydrogen or an alkali metal, such as sodium, potassium or lithium,
q is the number zero or 1 (where in the case where q is zero, this group is a hydrogen atom),
Ph is phenylene, which can be substituted by 1 or 2 substituents from the group consisting of alkyl of 1 to 4 carbon atoms, such as methyl and ethyl, alkoxy of 1 to 4 carbon atoms, such as methoxy and ethoxy, halogen, such as chlorine and bromine, carboxyl and sulfo, and
Z is the fiber-reactive group of the general formula (2).

Of the phthalocyanine dyes according to the invention, those are preferred which have the general formula (15)

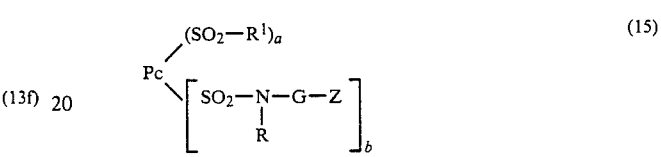
(15)

in which
Pc is the radical of a copper or nickel phthalocyanine;
$R^1$ is hydroxyl and/or an amino group of the formula $—NR^2R^3$, in which $R^2$ and $R^3$, independently of one another, are hydrogen or alkyl of 1 to 4 carbon atoms which can be substituted by hydroxyl or sulfo;
R is hydrogen or alkyl of 1 to 4 carbon atoms;
G is phenylene, which can be substituted by 1 or 2 substituents from the group consisting of alkyl of 1 to 4 carbon atoms, such as ethyl and methyl, halogen, such as chlorine and bromine, carboxyl and sulfo, such as, for example, a sulfophenylene, or is an alkylene of 2 to 6 carbon atoms, such as ethylene;
Z is the fiber-reactive group of the formula (2);
a is a number from 1 to 3 and
b is a number from 1 to 2,
the sum of (a+b) being a number from 3 to 4.

Further preference is given to azo dyes of the general formulae (16a) to (16j):

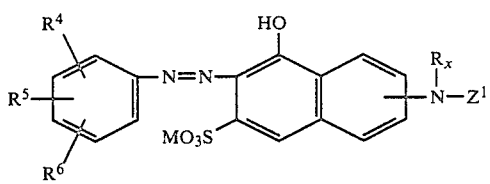
(16a)

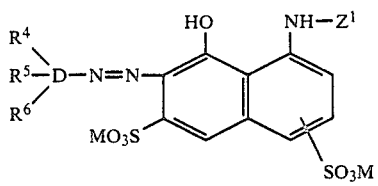
(16b)

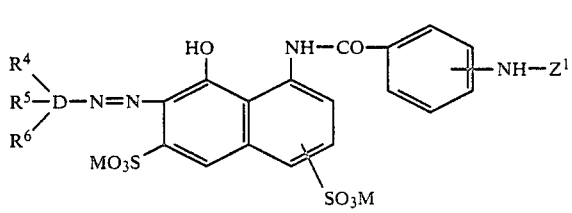
(16c)

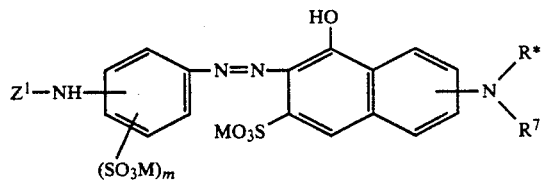 (16d)

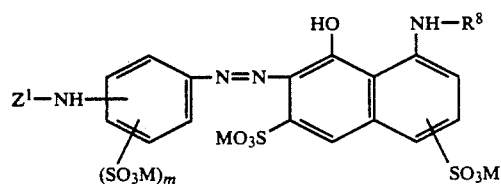 (16e)

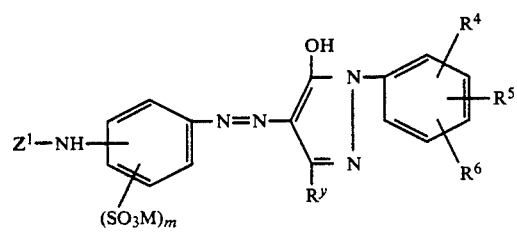 (16f)

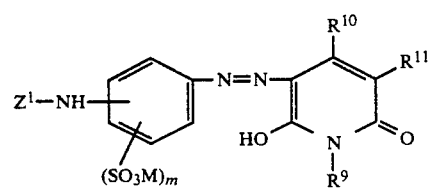 (16g)

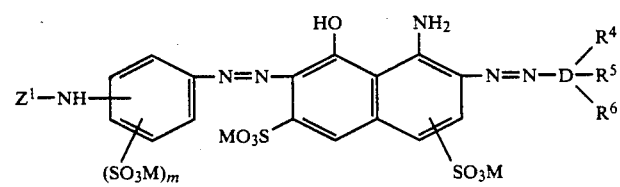 (16h)

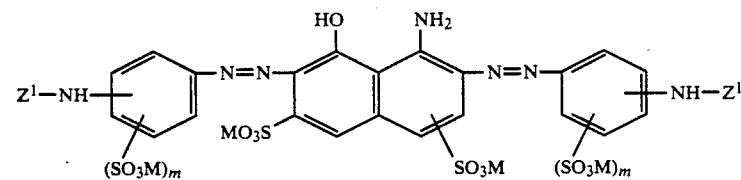 (16j)

in which
M has one of the abovementioned meanings;
$R^x$ is hydrogen or alkyl of 1 to 4 carbon atoms, such as methyl;
$R^4$ is hydrogen, alkyl of 1 to 4 carbon atoms, such as ethyl and in particular methyl, alkoxy of 1 to 4 carbon atoms, such as ethoxy and in particular methoxy, halogen, such as chlorine and bromine, carboxyl, sulfo, β-sufatoethylsulfonyl or vinylsulfonyl;
$R^5$ is hydrogen, alkyl of 1 to 4 carbon atoms, such as ethyl and in particular methyl, alkoxy of 1 to 4 carbon atoms, such as ethoxy and in particular methoxy, halogen, such as chlorine and bromine, carboxyl and sulfo;
$R^6$ is hydrogen or sulfo;
$Z^1$ is a radical of the general formula (2A)

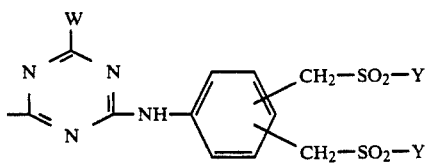 (2A)

in which W and Y have one of the abovementioned meanings:
D is a benzene ring or a naphthalene ring containing the azo group in the β-position;
m is the number zero, 1 or 2 (where in the case where m is zero this group is a hydrogen atom);
$R^*$ is hydrogen or methyl;
$R^7$ is alkanoyl of 2 to 5 carbon atoms, such as acetyl, or benzoyl, β-sulfatoethylsulfonyl or 3-(β-chloroethylsulfonyl)benzoyl;

$R^8$ is alkanoyl of 2 to 5 carbon atoms such as acetyl or is benzoyl or 3-($\beta$-chloroethylsulfonyl)benzoyl;

$R^7$ is methyl or carboxyl;

$R^9$ is hydrogen or alkyl of 1 to 4 carbon atoms, such as methyl or ethyl, or is phenyl;

$R^{10}$ is hydrogen or alkyl of 1 to 4 carbon atoms, such as methyl, or is phenyl;

$R^{11}$ is hydrogen or cyano, carbamoyl or sulfomethyl.

Further preferred dyes according to the invention of the general formula (1) are those of the formulae (17a), (17b) and (18) to (30) shown below:

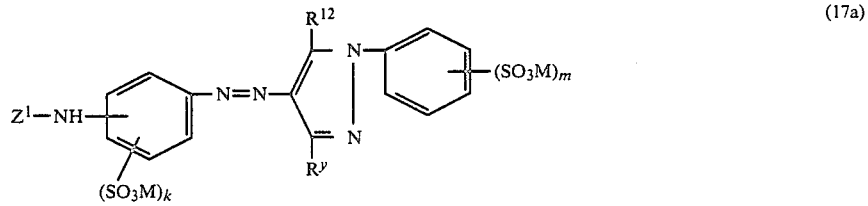 (17a)

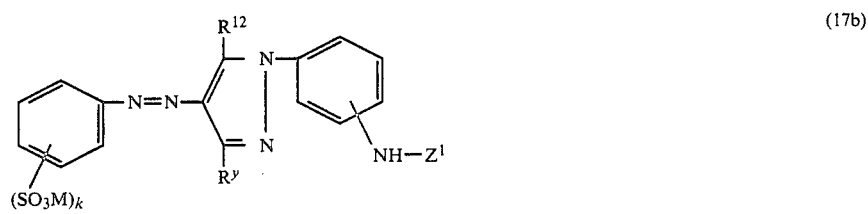 (17b)

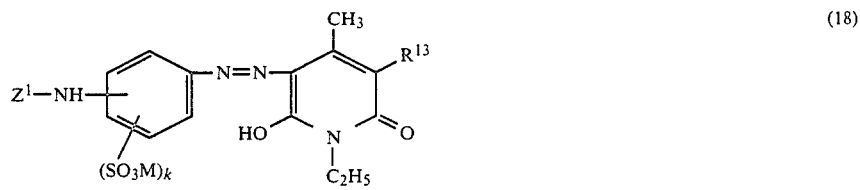 (18)

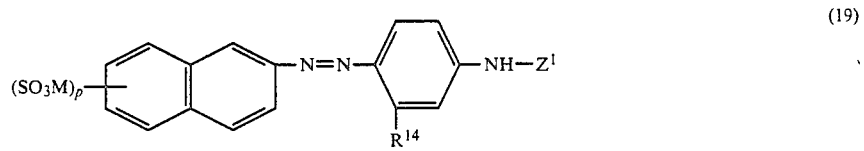 (19)

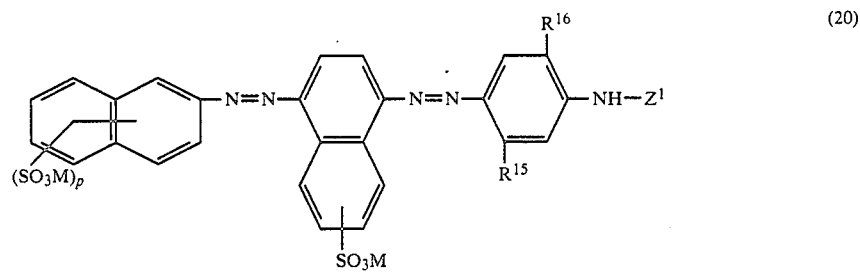 (20)

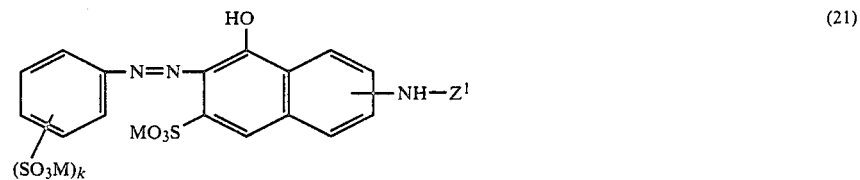 (21)

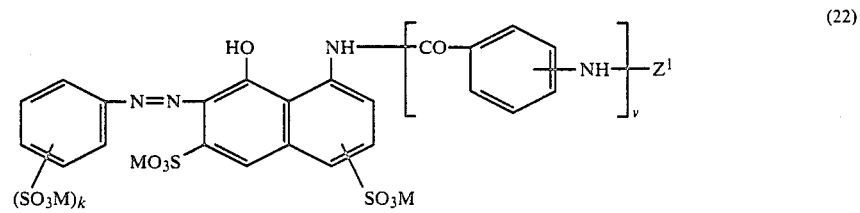 (22)

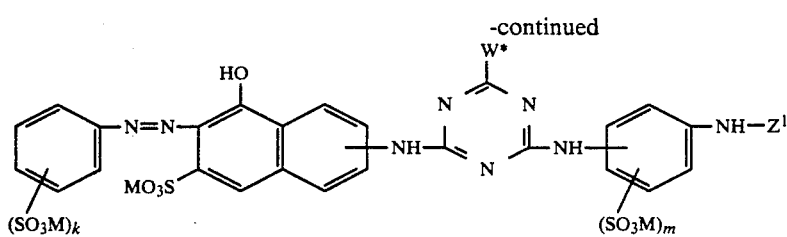
(23)
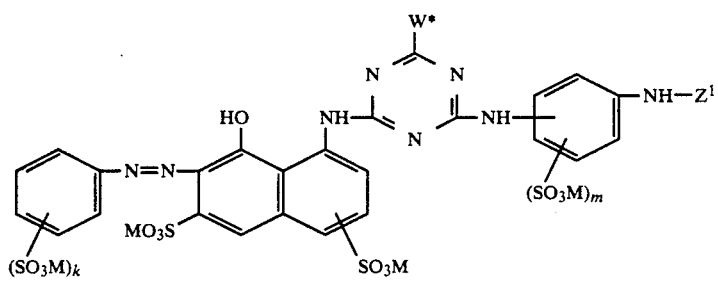
(24)
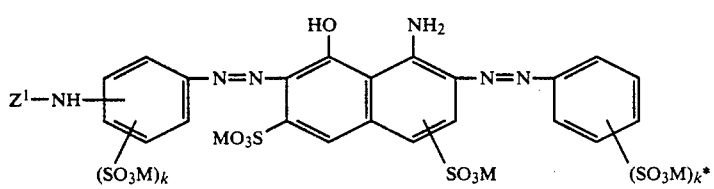
(25)
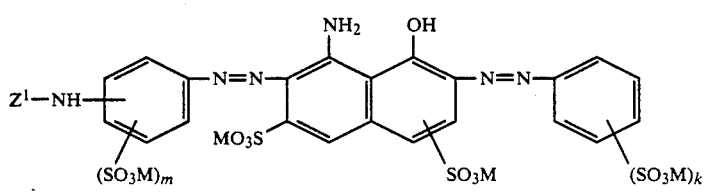
(26)
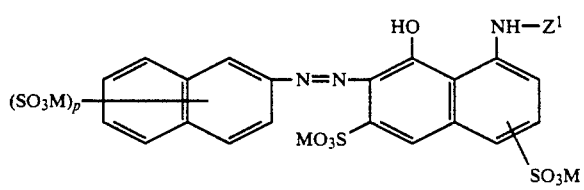
(27)
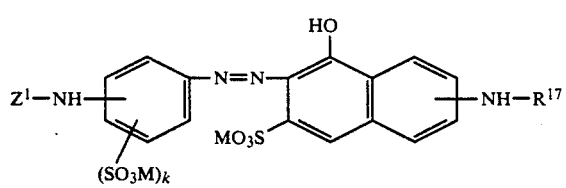
(28)
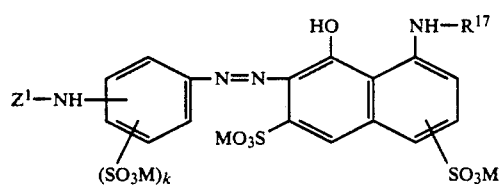
(29)
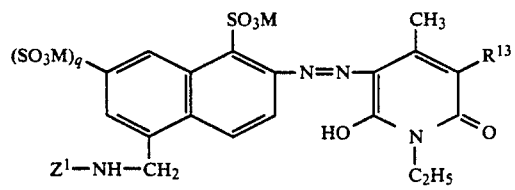
(30)
furthermore the metal complex dyes, such as the 1:2 chromium and 1:2 cobalt and in particular 1:1 copper complex dyes of the compounds of the formulae (31) to (36):

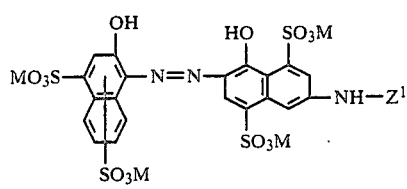 (31)
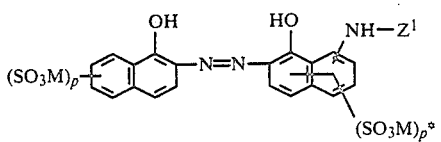 (34)
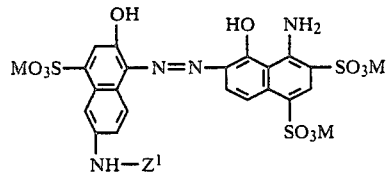 (32)
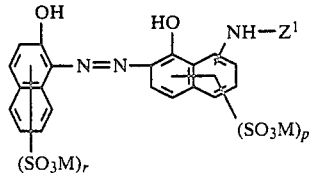 (35)
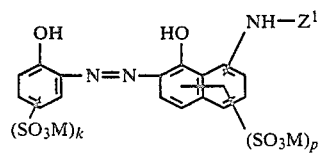 (33)
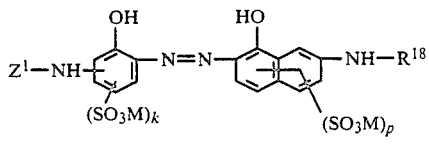 (36)
furthermore the dyes of the formula (37) to (56):
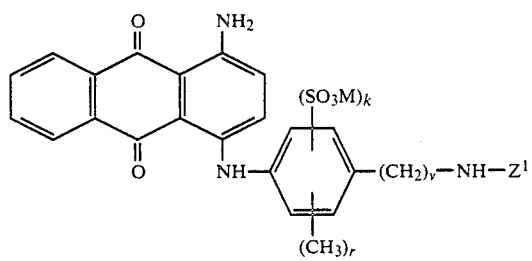 (37)
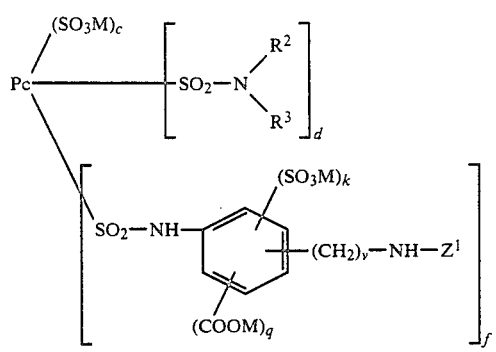 (38)
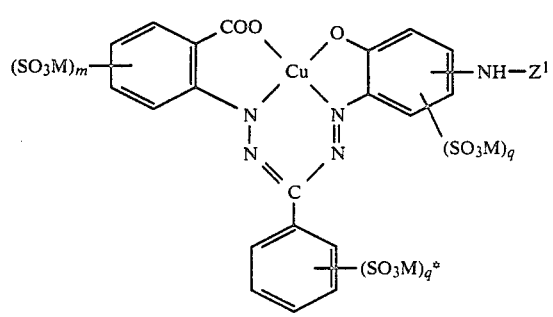 (39)

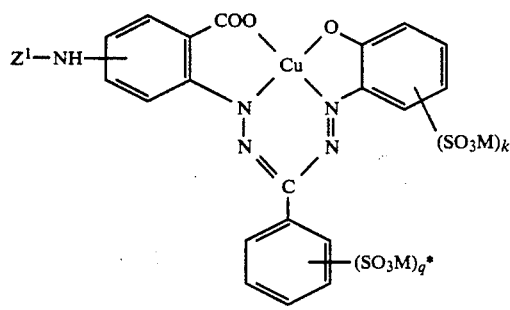 (40)
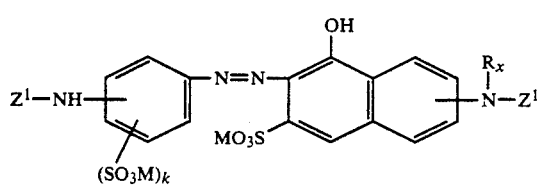 (41)
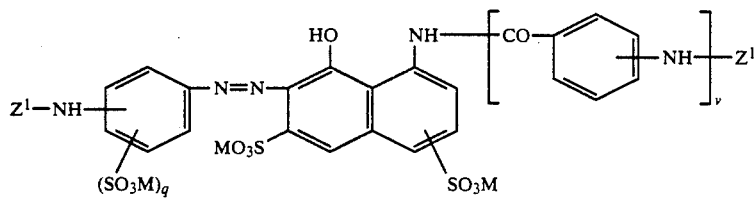 (42)
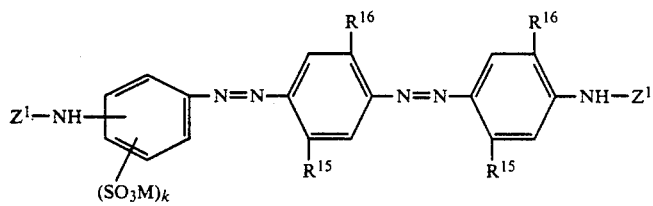 (43)
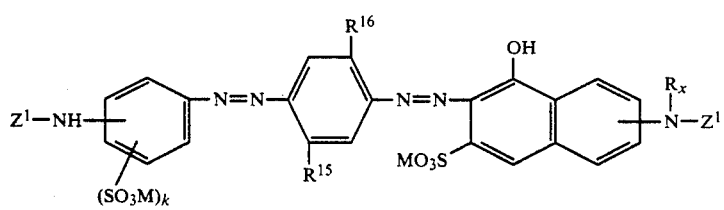 (44)
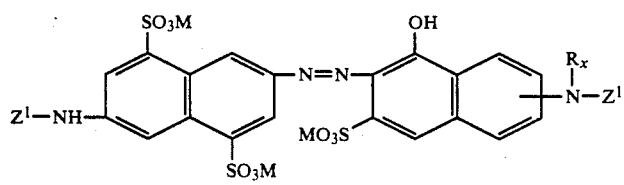 (45)
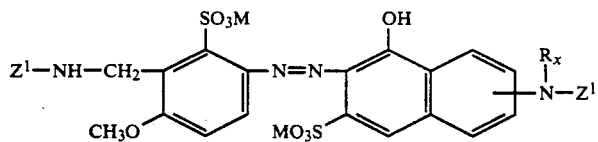 (46)
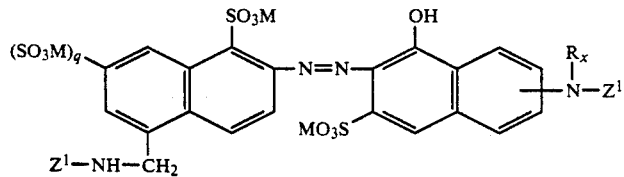 (47)

-continued
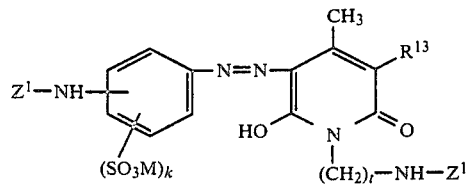
(48)
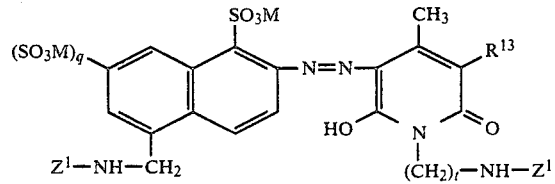
(49)
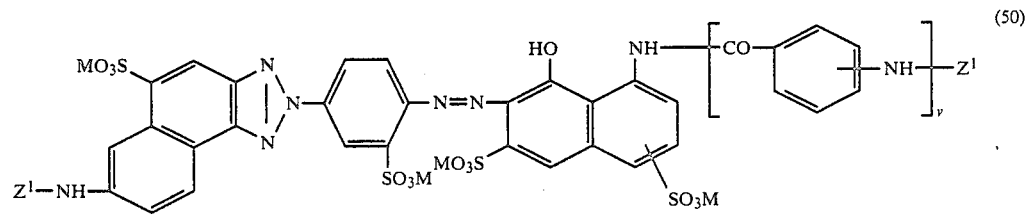
(50)
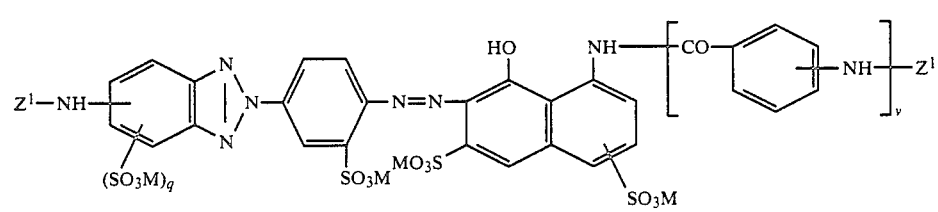
(51)
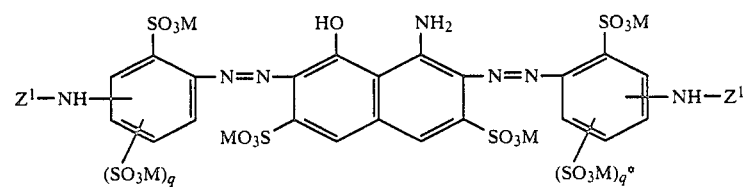
(52)
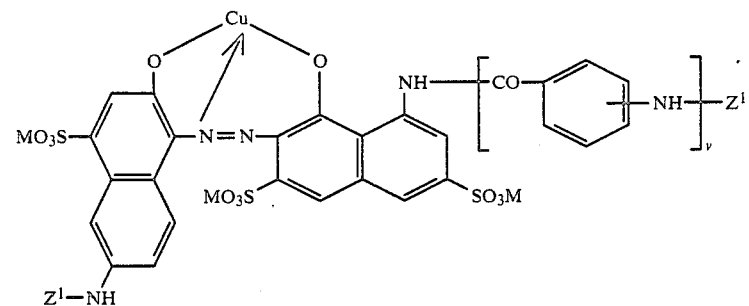
(53)
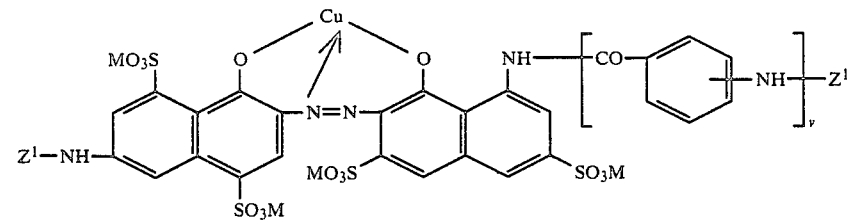
(54)
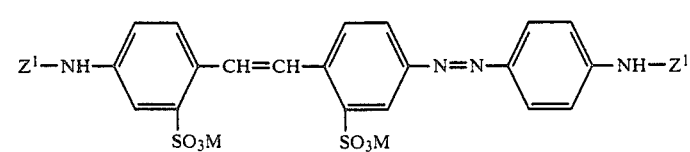
(55)

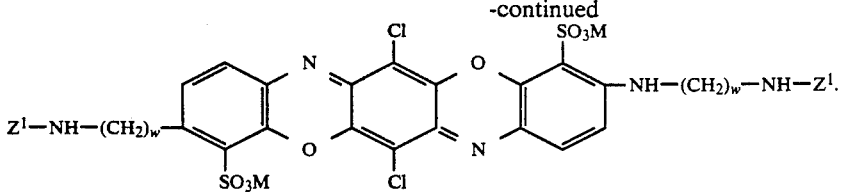
(56)

In these formulae:

M, m, $Z^1$ and $R^7$ have the abovementioned meanings;
k is the number 1 or 2;
k* is the number 1 or 2;
$R^{12}$ is hydroxyl or amino;
$R^{13}$ is cyano, carbamoyl or sulfomethyl;
$R^{14}$ is methyl, acetylamino or ureido;
p is the number 1, 2 or 3;
p* is the number 1, 2 or 3;
$R^{15}$ is hydrogen or alkyl of 1 to 4 carbon atoms, such as methyl and ethyl, alkoxy of 1 to 4 carbon atoms, such as methoxy and ethoxy, alkanoylamino of 2 to 5 carbon atoms, such as acetylamino, ureido or halogen, such as bromine and in particular chlorine, but is preferably hydrogen, methyl, ethyl, methoxy, ethoxy, acetylamino, ureido or chlorine;
$R^{16}$ is hydrogen or alkyl of 1 to 4 carbon atoms, such as methyl and ethyl, alkoxy of 1 to 4 carbon atoms, such as methoxy and ethoxy, or halogen, such as bromine and in particular chlorine, but is preferably hydrogen or methyl, ethyl, methoxy, ethoxy or chlorine;
v is the number zero or 1;
W* is chlorine or fluorine;
$R^{17}$ is acetyl or benzoyl;
$R^{18}$ is hydrogen or acetyl;
r is the number zero or 1, 2 or 3 (where in the case where r is zero this group is a hydrogen atom);
$R^2$ is hydrogen or alkyl of 1 to 4 carbon atoms, such as methyl or ethyl, and
$R^3$ is hydrogen or alkyl, such as methyl or ethyl, or
$R^2$ and $R^3$ together with the nitrogen atom form a heterocyclic radical containing an alkylene group of 3 to 7 carbon atoms or one or two alkylene groups of 1 to 5 carbon atoms and a further hetero group, such as a nitrogen or oxygen atom or a group —NH— or —N(CH$_3$)— or —N(C$_2$H$_5$)—, such as, for example, an N-piperidino or N-morpholino radical;
q is the number zero or 1 (where in the case where q is zero this group is a hydrogen atom);
q* is the number zero or 1 (where in the case where q* is zero this group is a hydrogen atom);
Pc is the radical of a copper or nickel phthalocyanine;
c is a number from 1 to 3,
d is a number from 0.5 to 1.5 and
f is a number from 1 to 2, the sum of (c+d+f) being a number from 3 to 4;
$R^x$ is hydrogen or alkyl of 1 to 4 carbon atoms, such as methyl;
t is the number 2 or 3;
w is the number 2, 3 or 4;
the benzene rings shown in the abovementioned dye formulae can additionally be substituted, such as, for example, by 1 or 2 substituents from the group consisting of methyl, ethyl, methoxy, ethoxy, methylsulfonyl, ethylsulfonyl, carboxyl, acetylamino and chlorine, and the naphthalene rings by a substituent from the group consisting of methoxy, carboxyl, acetylamino, nitro and chlorine The individual formula members, whether they have a different or the same symbol within a general formula, can, as far their definition is concerned, have meanings which are identical to or different from one another.

Furthermore, the present invention relates to processes for the preparation of the dyes according to the invention of the general formula (1). They can be prepared in a manner customary per se analogously to known synthetic routes which are specific for the particular class of dyes by reacting precursors which are typical for the particular dye and at least one of which contains a group of the general formula (2) with one another or by reacting an amino-containing starting compound of the general formula (59)

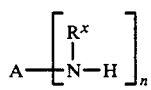
(59)

in which A, $R^x$ and n have the abovementioned meanings and an s-triazine of the general formula (60)

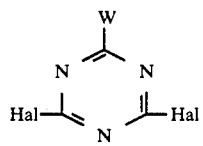
(60)

in which W has the abovementioned meaning and Hal is a halogen atom, such as, in particular, a chlorine or fluorine atom, and an amine of the general formula (58)

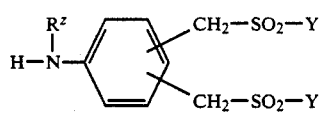
(58)

in which $R^z$ and Y have the abovementioned meanings, in stoichiometric amounts in any desired order with one another and, if desired, subsequently carrying out further necessary transformation reactions known to one skilled in the art.

In particular, the dyes according to the invention can be prepared according to the invention by reacting a compound of the general formula (57)

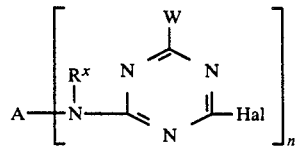
(57)

in which A, $R^x$, W and n have the abovementioned meanings, and Hal is a halogen atom, such as, in particular, a chlorine or fluorine atom, with an amino compound of the general formula (58)

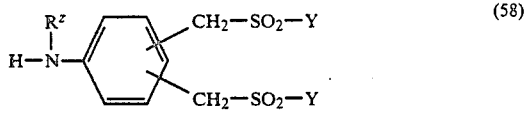

in which $R^z$ and Y have the abovementioned meanings in stoichiometric amounts with one another.

The starting compound of the general formula (57) can be prepared, for example, by reaction of the corresponding starting dye of the general formula (59)

in which A, $R^x$ and n have the abovementioned meanings with an s-triazine compound of the general formula (60)

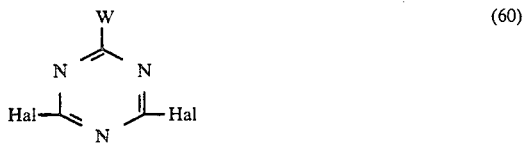

in which W and Hal have the abovementioned meaning; another possibility of synthesizing the starting compound of the formula (57) analogously to known procedures is, for example, the reaction of a dye precursor containing a group of the general formula (61)

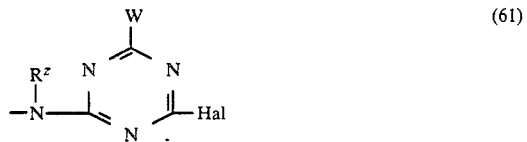

in which $R^z$, W and Hal have the abovementioned meanings with another precursor which, if desired, contains a group of the formula (61).

Under certain reaction conditions, a halogenotriazine radical can induce hydrolysis; that is why in the case of an intermediate or precursor which contains a protective group, such as, for example, an acetylamino group, the acetyl group has to be cleaved off by hydrolysis before the reaction with the halogenotriazine can take place. In what order the various abovementioned reactions between the halogenotriazine and the amino starting compounds are advantageously carried out, is different from case to case and depends in particular on the solubility of the amino compounds involved and the basicity of the amino groups which are to be reacted with the halogenotriazine radical.

The dyes according to the invention can also be prepared in such a manner that, starting from an amine of the general formula (58) of the abovementioned meaning, except that the groups Y are β-hydroxyethyl groups, a starting dye which has the general formula (1) of the meaning mentioned, except that the groups Y are β-hydroxyethyl groups, is prepared analogously to the abovementioned procedures according to the invention and the β-hydroxyethyl groups in this starting dye are converted to β-sulfatoethyl groups analogously to known procedures. The sulfation is carried out, for example, by reaction with concentrated sulfuric acid or sulfuric acid containing sulfur trioxide at a temperature between 0 and 20° C. or by reaction with chlorosulfonic acid or sulfamic acid, for example in a polar organic solvent, such as, for example, N-methylpyrrolidone at a temperature between 10 and 80° C. Preferably, the sulfation is carried out by adding the starting dye which contains β-hydroxyethyl groups to sulfuric acid monohydrate at a temperature between 5 and 15° C.

The introduction of a different group Y in a finished dye according to the invention of the general formula (1) or even in the corresponding starting dye which contains β-hydroxyethyl groups is carried out analogously to the procedures customary for reactive groups of the vinylsulfonyl series. For example, the starting dye which contains one (or more) β-hydroxyethyl groups is converted in a customary and known manner to compounds of the formula (1) in which Y has a meaning other than a β-hydroxyethyl group, thus, for example, to other ester derivatives of polybasic inorganic acids or aliphatic and aromatic carboxylic or sulfonic acids, thus, for example, to compounds in which Y is a β-chloroethyl, β-phosphatoethyl, β-thiosulfatoethyl, β-acetoxyethyl or β-toluylsulfonyloxyethyl group. Esterification and acylating agents which are suitable for this conversion are, for example, the corresponding inorganic or organic acids or their anhydrides or halides or amides, such as, for example, phosphoric acid, polyphosphoric acid, phosphorus oxychloride, mixtures of phosphoric acid and phosphorus pentoxide, acetic anhydride, toluenesulfonyl chloride and thionyl chloride.

Those compounds in which Y is a vinyl group can be prepared from their analogous ester derivatives by means of alkali, for example in aqueous medium at a pH of 10 to 12 and a temperature between 30 and 50° C. for 10 to 20 minutes. The synthesis of, for example, β-(dialkyamino)ethylsulfonyl and β-thiosulfatoethylsulfonyl derivatives is carried out by reaction of their vinylsulfonyl compounds with a corresponding dialkylamino or with an alkali metal salt of thiosulfuric acid, such as sodium thiosulfate. All these procedures of converting a group —SO₂—Y into another group are known to one skilled in this fiber-reactive area and have been described in large numbers in the literature.

In general, the dyes according to the invention of the general formula (1) of all classes of dyes can be synthesized in a known manner or analogously to known procedures by starting with precursors or intermediates for dyes which already contain a fiber-reactive grouping of the general formula (2) or by introducing this fiberreactive grouping in intermediates which are suitable for this and have dye character.

The reaction of the starting compound of the general formula (57) with the amine of the general formula (58) is carried out in aqueous or aqueous-organic medium in suspension or solution at a temperature between −5° C. and +40° C., preferably between 0 and 25° C., and at a pH between 2 and 8, preferably between 4 and 7.5. If the reaction is carried out in an aqueous-organic medium, the organic medium is, for example, acetone, dimethylformamide and N-methylpyrrolidone. Advantageously, the hydrogen halide which is liberated during the condensation reaction is constantly neutralized by the addition of aqueous alkali metal hydroxides, alkali metal carbonates or alkali metal bicarbonates. To react the halogenotriazine dyes thus obtained further or to react the 2,4,6-trihalogen-s-triazine with the compounds of the formula (57), the free amines or their salts, preferably in the form of the hydrochloride, are used.

The condensation of the halogenotriazine with a compound of the formula (57) can take place before or after the condensation of the halogenotriazine with a starting dye of the formula (59). The condensation of the halogenotriazine with a compound of the formula (58) likewise takes place preferably in aqueous solution or suspension, at low temperature, such as at $-5°$ C. to $+25°$ C., and in an acidic to weakly alkaline range, such as at a pH between 3 and 8. In this case, too, the hydrogen halide which is liberated during the condensation reaction is advantageously neutralized by a constant addition of aqueous alkali metal hydroxides, alkali metal carbonates or alkali metal bicarbonates.

Examples of halogeno-s-triazine starting compounds of the general formula (60) are cyanuric fluoride (2,4,6-trifluoro-1,3,5-triazine), cyanuric chloride (2,4,6-trichloro-1,3,5-triazine) and 4-sulfo-2,6-dichloro-1,3,5-triazine.

The amino compounds of the general formula (58) can be prepared by starting with a 1,2-di(halogenomethyl)benzene or the corresponding 1,3- or 1,4-isomers, in which the halogen is preferably a chlorine atom, and reacting the di-(halogenomethyl)benzene with mercaptoethanol in aqueous medium at a pH between 8 and 12, preferably between 10.5 and 11.5, and at a temperature between 30 and 120° C., preferably between 70 and 100° C., to give the corresponding dithioether compound. The resulting thioether compound is then oxidized analogously to known procedures to the corresponding sulfonyl compound. The oxidation can be carried out by various methods, for example in aqueous, acidic medium, preferably at a pH of less than 5, by means of hydrogen peroxide in the presence or absence of tungsten or vanadium compounds as catalysts, furthermore by means of peracetic acid, potassium permanganate or chromic acid, in each case at a temperature between 50 and 120° C, preferably between 80 and 100° C., or by means of a solution of elemental chlorine in aqueous hydrochloric acid in accordance with the procedure in German Patent No. 887,505; if chlorine/hydrochloric acid is used, the corresponding $\beta$-chloroethylsulfonyl compounds of the general formula (58) are obtained.

The resulting di($\beta$-chloroethylsulfonylmethyl) and di($\beta$-hydroxyethylsulfonylmethyl)benzene compounds are then nitrated in the usual manner, for example in a mixture of nitric acid and concentrated sulfuric acid at a temperature between 30 and 100° C.

This converts the hydroxyl groups into sulfato groups which are subsequently hydrolyzed again at elevated temperature in aqueous/mineral acid solution. The resulting nitro compounds are then reduced to the aniline compounds by conventional procedures. The reduction can be carried out by means of hydrogen over a metal catalyst, such as a palladium, platinum or Raney nickel catalyst, under pressure in an autoclave, for example at a hydrogen pressure of 25 to 35 bar and a temperature between 40 and 80° C., or by Béchamp reduction with the use of iron filings. The $\beta$-hydroxyethylsulfonyl groups can then be converted to fiber-reactive groups of the formula $-SO_2-Y$ where Y has one of the abovementioned meanings in accordance with the procedures given above.

The dyes according to the invention of the formula (1) are suitable for the dyeing and printing of a wide range of materials, such as silk, leather, wool, polyamide fibers and polyurethanes, and in particular cellulosecontaining fiber materials of any type. Examples of these fiber materials are natural cellulose fibers, such as cotton, linen and hemp, and cellulose and regenerated cellulose. The dyes of the formula (1) are also suitable for the dyeing or printing of hydroxyl-containing fibers which are contained in mixed fabrics, for example of mixtures of cotton with polyester fibers or polyamide fibers.

The dyes according to the invention can be applied to the fiber material and fixed on the fiber by various methods, in particular in the form of aqueous dye solutions and color print pastes. They are suitable not only for the exhaust process but also for dyeing by the padding method, in which the material is impregnated with aqueous dye solutions which may contain salts and the dye is fixed after an alkali treatment or in the presence of alkali, if necessary with exposure to heat. The dyes according to the invention are particularly suitable for the cold pad-batch method, in which the dye is applied together with alkali on a pad-mangle and is then fixed by leaving it at room temperature for several hours. After fixing, the dyes and prints are thoroughly rinsed with cold and hot water, if necessary with the addition of an agent which acts as a dispersant and promotes the diffusion of the unfixed portions.

The dyes of the formula (1) are distinguished by high reactivity, good fixation properties and very good buildup properties. They can therefore be used in the exhaust method at low dyeing temperatures and require only short steaming times in the pad-steam process. The degrees of fixation are high and the unfixed portions can easily be washed off, the difference between the degree of exhaustion and degree of fixation being remarkably small, i.e. the soap loss is very small. The dyes of the formula (1) are also in particular suitable for printing, in particular on cotton, but also for the printing of nitrogencontaining fibers, for example of wool or silk or of mixed fabrics which contain wool or silk.

The dyeings and prints on cellulose fiber materials produced by the dyes according to the invention have a high color strength and a high stability of the dye/fiber linkage not only in the acidic but also in the alkaline range, furthermore good light fastness and very good wet fastness properties, such as wash, water, sea water, cross-dyeing and perspiration fastness properties and also good pleating fastness, hot press fastness and rub fastness.

The Examples which follow serve to illustrate the invention. The parts and percentages are by weight, unless stated otherwise. Parts by weight relate to parts by volume as the kilogram relates to the liter.

The compounds described in these Examples by way of their formulae are given in the form of the free acid; in general, they are prepared and isolated in the form of their alkali metal salts, such as lithium salts, sodium salts or potassium salts, and are used for dyeing in the form of their salts.

Likewise, starting compounds and components mentioned in the Examples below, in particular the Table Examples, in the form of the free acid can be used in the synthesis as such or in the form of their salts, preferably the alkali metal salts.

The absorption maxima ($\lambda_{max}$) in the visible region shown for the compounds according to the invention were determined, using their alkali metal salts in aqueous solution. In the Table Examples, the $\lambda_{max}$ values are written in brackets next to their hues; the wavelength numbers are given in nm.

EXAMPLE 1

48.3 parts of 1-(4'-sulfophenyl)-3-carboxy-4-(4"-amino-2"-sulfophenylazo)-5-pyrazolone are reacted in aqueous solution (750 parts of ice-water) at 0 to 2° C. and a pH of 5 with 14 parts of cyanuric fluoride. As soon as no more free amino groups re detectable, 49.7 parts of 2,5-bis(β-sulfatoethylsulfonylmethyl)aniline are added and the reaction is carried out at 0 to 20° C. and a pH of 5 to 7. The synthesized azo dye according to the invention is precipitated with potassium chloride. Written in the form of the free acid, it has the formula

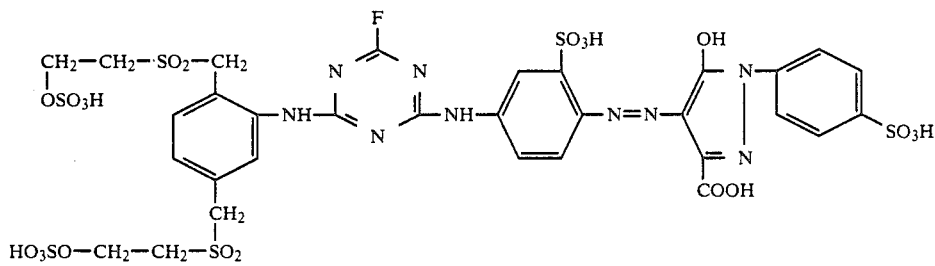

($\lambda_{max}$ = 427 nm)

and dyes the materials mentioned in the description in particular cellulose fiber materials, such as cotton, in golden-yellow hues which have good fastness properties by the application and fixation processes customary in fiber-reactive dye technology.

EXAMPLE 2

The monocondensation product from 18.8 parts of 1,3-phenylenediamine-4-sulfonic acid and 19 parts of cyanuric chloride is diazotized in the usual manner, and this diazonium compound is coupled onto 28.5 parts of 1-(4'sulfophenyl)-3-carboxy-5-pyrazolone at a pH between 5 and 7 and a temperature between 10 and 20° C. A neutral aqueous solution of 49.7 parts of 2,5-bis(β-sulfatoethylsulfonylmethyl)aniline is then added, and the temperature is increased to 40° C. and the pH adjusted to 5.5. After the condensation reaction is completed, the dye according to the invention is precipitated with potassium chloride from the neutral solution and isolated. Written in the form of the free acid, it has the formula

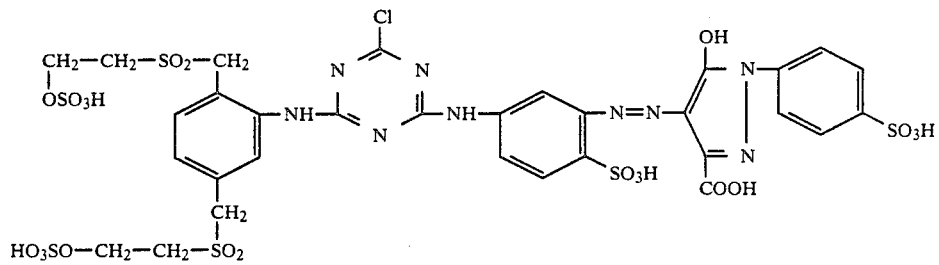

($\lambda_{max}$ = 428 nm)

and has very good fiber-reactive dye properties. For example, on cotton, it produces yellow dyeings and prints which have high color strength and good fastness properties.

EXAMPLE 3

To prepare an azo compound according to the invention, the procedure of Example 2 is repeated, except that the same amount of 3,4-bis(β-sulfatoethylsulfonylmethyl)aniline is used instead of 2,5-bis(β-sulfatoethylsulfonylmethyl)aniline. This gives the dyestuff according to the invention of the formula

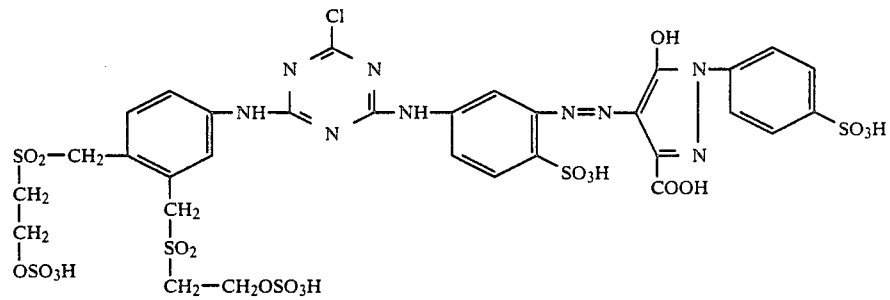

($\lambda_{max}$ = 427 nm)

in form of the alkali metal salt (potassium salt). On the materials mentioned in the description, such as in particular cotton, it produces yellow dyeings and prints which have high color strength and good fastness properties.

EXAMPLE 4

The monocondensation product from 19 parts of cyanuric chloride and the azo compound prepared from 30.3 parts of 2-aminonaphthalene-4,8-disulfonic acid as diazo component and 15 parts of 3-acetylaminoaniline as coupling component is prepared, and this product is reacted in aqueous medium at 20° C. and a pH of 6 to 7 with 49.7 parts of 2,5-bis(β-sulfatoethylsulfonylmethyl)aniline. The azo dye according to the invention is isolated by precipitation with potassium chloride and filtration. Written in the form of the free acid, it has the formula

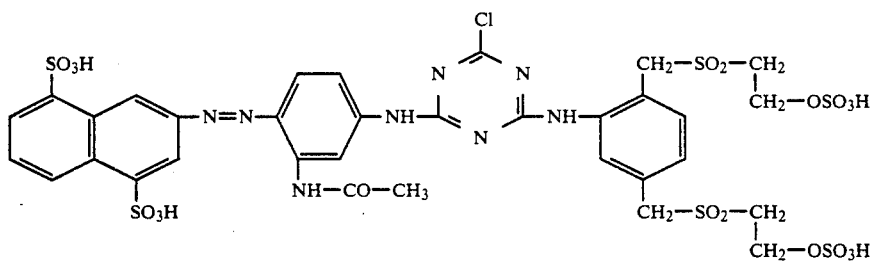

($\lambda_{max}$ = 392 nm)

and dyes the materials mentioned in the description, such as in particular cellulose fiber materials, in reddish yellow hues which have high color strength and good fastness properties.

EXAMPLE 5

The starting azo compound used in Example 4 is reacted in aqueous medium at 0 to 2° C. and a pH of 6 to 7 with 14 parts of cyanuric fluoride, and 49 7 parts of 2,5-bis(β-sulfatoethylsulfonylmethyl)aniline are then added and the second condensation reaction is carried out at a pH of 6 to 7 and a temperature between 0 and 20° C. After the reaction is completed, the aqueous synthesis solution is brought to a pH of .10 at a temperature of 20° C. by means of sodium hydroxide solution. After about 15 minutes the transformation of the β-sulfatoethylsulfonyl group into the vinylsulfonyl form is completed. The synthesis solution is brought to a pH of 6.5, and the azo dye according to the invention is precipitated by means of potassium chloride and isolated. Written in the form of the free acid, it has the formula

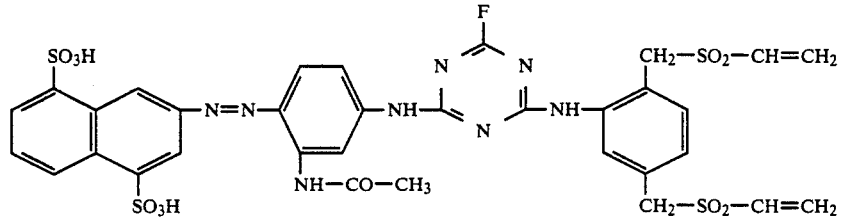

($\lambda_{max}$ = 393 nm)

and dyes, for example, cotton by the application processes customary in fiber-reactive dye technology in reddish yellow hues which have high color strengths and good fastness properties.

EXAMPLE 6

50.3 parts of 2-amino-5-hydroxy-6-(2′,5′-disulfophenyl-azo)naphthalene-7-sulfonic acid are reacted in neutral aqueous solution (800 parts of water) at 0 to 5° C. and a pH of 3.5 to 4.5 with 19 parts of finely dispersed cyanuric chloride. 49.7 parts of 2,5-bis(β-sulfatoethylsulfonylmethyl)aniline are then added, the mixture is warmed to 40° C., and the pH brought to a value of 5.5. The second condensation reaction is completed under these conditions, and the azo dye according to the invention is isolated after a conventional clarification of the synthesis solution, for example by means of spray-drying. Written in the form of the free acid it has the formula

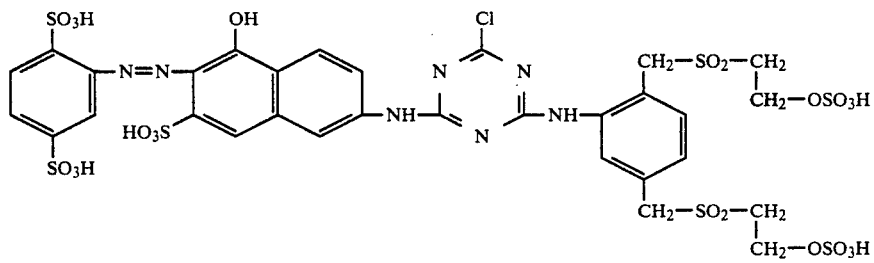

($\lambda_{max}$ = 471 nm)

and dyes, for example, cotton in orange hues which have high color strength and good fastness properties.

EXAMPLE 7

To prepare an azo dye according to the invention, the procedure of Example 6 is repeated, except that 43.1 parts of 2-amino-5-hydroxy-6-(2′,5′-dicarboxyphenylazo)-naphthalene-7-sulfonic acid are used as starting azo compound. The azo dye according to the invention of the formula (written in the form of the free acid)

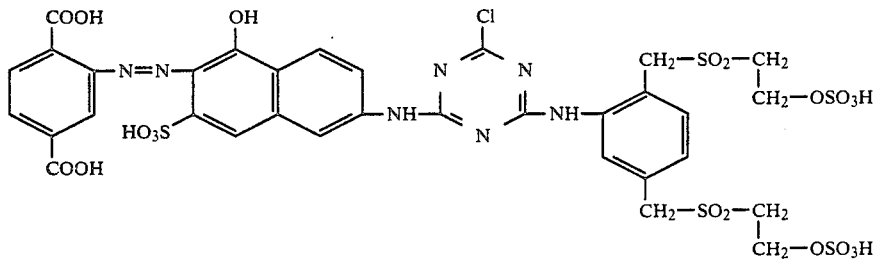

($\lambda_{max}$ = 480 nm)

has very good fiber-reactive dye properties and produces on the materials mentioned in the description, such as, for example, cotton, dyeings and prints in orange hues which have high color strength and good fastness properties.

EXAMPLE 8

To prepare the dye according to the invention of Example 7 in its vinylsulfonyl form, the aqueous synthesis solution of the dye of Example 7 is used as the starting material and brought to a pH of 10 at 20° C. by means of sodium hydroxide solution. After a reaction time of 15 minutes, the mixture is brought to a pH of 6.5, the dye solution is clarified and the resulting dye according to the invention of the formula (written in the form of the free acid)

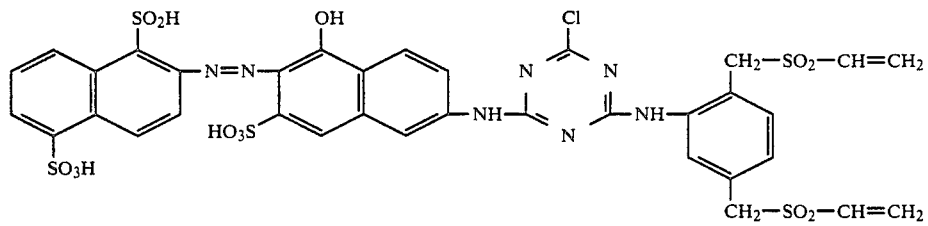

is precipitated as the alkali metal salt (potassium salt) by means of potassium chloride and isolated. It also has very good fiber-reactive dye properties and dyes, for example, cotton in orange hues which have high color strength and good fastness properties.

EXAMPLE 9

To prepare an azo dye according to the invention, the procedure of Example 6 is repeated, except that 43.1 parts of 2-amino-5-hydroxy-6-(2′-sulfo-4′-methoxyphenyl-azo)naphthalene-7-sulfonic acid are used as starting azo compound. Written in the form of the free acid, the synthesized dye according to the invention has the formula

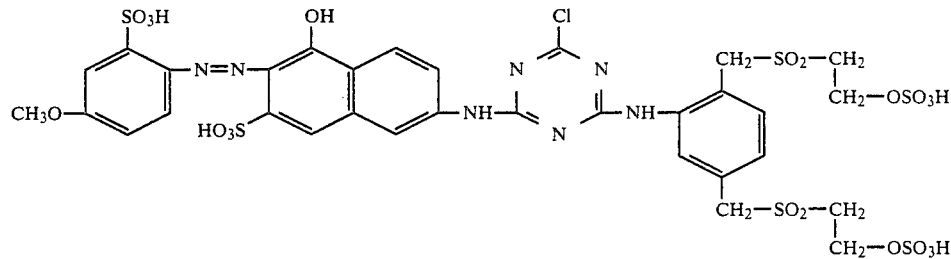

($\lambda_{max}$ = 500 nm).

It dyes, for example, cotton by the application and fixation processes customary in fiber-reactive dye technology in bright scarlet hues which have good fastness properties.

EXAMPLE 10

At 0 to 5° C. and a pH of 6.5, 47 parts of the known aminodisazo compound of the formula

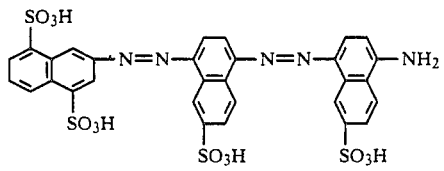

in 300 parts of water are reacted with 10 parts of cyanuric chloride. The resulting product is then reacted with 26 parts of 2,5-bis($\beta$-sulfatoethylsulfonylmethyl)aniline at a temperature of 20 to 25° C. and a pH of 6.5. After clarifying filtration, the dye according to the invention is isolated by spray-drying. This gives the electrolyte-containing dye powder of the alkali metal salt of the disazo compound

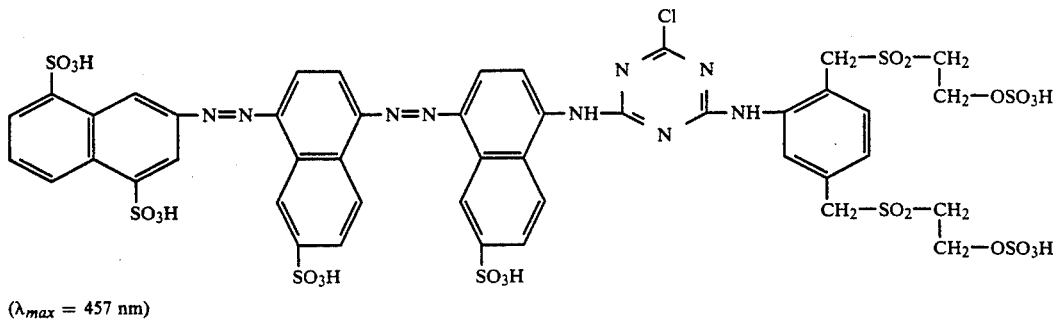

($\lambda_{max}$ = 457 nm)

which dyes cotton in reddish brown hues which have good fastness properties.

EXAMPLE 11

67.2 parts of the known aminodisazo compound 4-[4'-(2''-sulfo-4''-methoxyphenyl)azo-6'-sulfonaphth-1'-yl]azo-1-aminonaphthalene-6-sulfonic acid are reacted in aqueous solution (800 parts of water) at a pH of 6.5 and a temperature of 0 to 5° C. with 15 parts of cyanuric chloride. 49.7 parts of 2,5-bis-($\beta$-sulfatoethylsulfonylmethyl)aniline are then added, and the second condensation reaction is carried out at 20 to 35° C. and a pH of 5.5 to 6.5. The synthesis solution is then clarified, and the resulting dye according to the invention of the formula (written in the form of the free acid)

solution of the diazonium salt of 17.3 parts of 1-aminobenzene-2-sulfonic acid is then added to this reaction mixture, and the coupling reaction is carried out at a pH of 4 to 4.5. 49.7 parts of 2,5-bis($\beta$-sulfatoethylsulfonylmethyl)aniline are then added, and the condensation reaction is carried out at 35° C. and a pH of 5.5 to 6.5, the synthesis solution is then clarified, and the dye according to the invention of the formula (written in the form of the free acid)

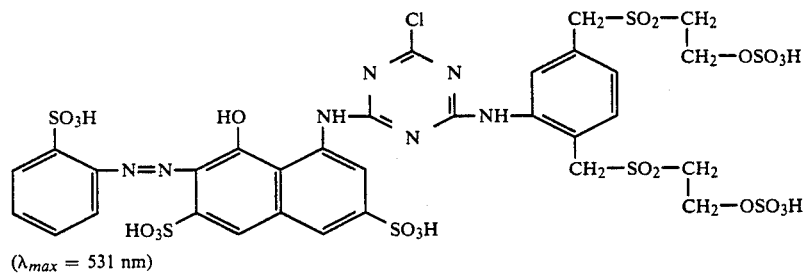

($\lambda_{max}$ = 531 nm)

is isolated by spray-drying. It has very good fiber-reactive dye properties and dyes the materials mentioned in the description, such as, for example, cotton, by the application processes customary for fiber-reactive dyes in red hues which have high color strength and good fastness properties.

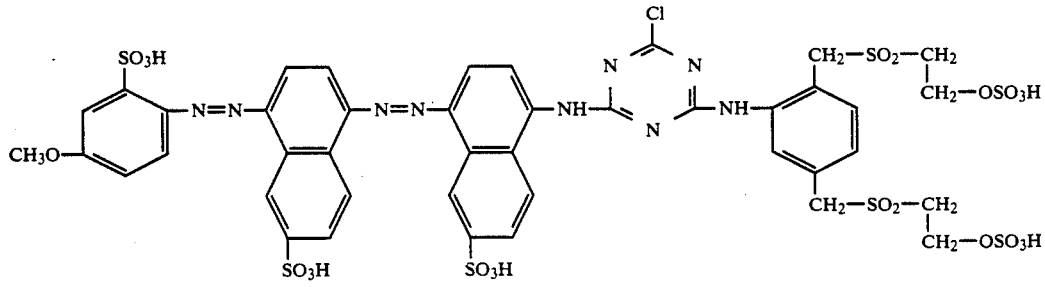

($\lambda_{max}$ = 450 nm)

is isolated as the alkali metal salt by evaporation under reduced pressure or by spray-drying. It has very good fiber-reactive dye properties and dyes, for example, cotton in reddish brown hues which have good fastness properties.

EXAMPLE 12

19 parts of cyanuric chloride are reacted in a known manner with 32 parts of 1-amino-8-hydroxynaphthalene-3,6-disulfonic acid in aqueous medium. The acid

EXAMPLE 13

To prepare an azo dye according to the invention, the procedure of Example 12 is repeated, except that the diazonium salt from 18.1 parts of 2,5-dicarboxyaniline is used as the diazo component and the coupling reaction is carried out at a pH of 6.5 to 7. This gives the azo dye according to the invention of the formula (written in the form of the free acid)

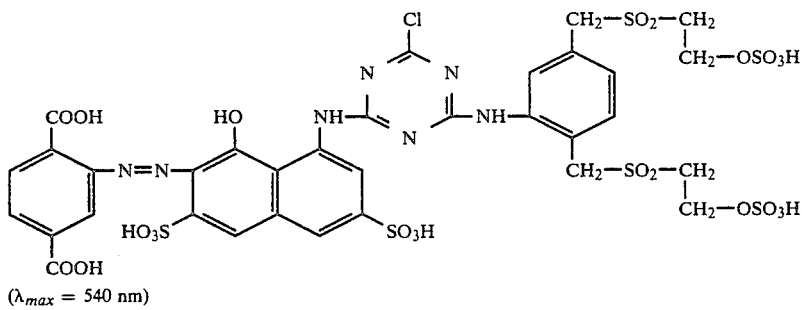

($\lambda_{max}$ = 540 nm)

as the alkali metal salt. It has good dye properties and produces, for example, on cotton, brilliant red dyeings a dye according to the invention of the formula (written in the form of the free acid)

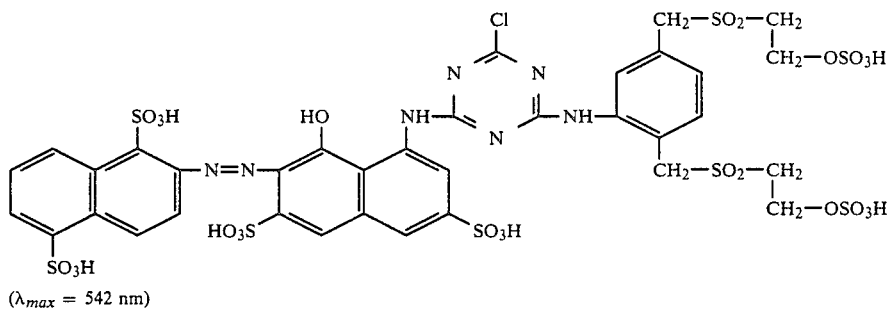

($\lambda_{max}$ = 542 nm)

and prints which have high color strength and good fastness properties.

EXAMPLE 14

To prepare an azo dye according to the invention, the procedure of Example 12 is repeated, except that the diazonium salt from 28.1 parts of 4-($\beta$-sulfatoethylsulfonyl)aniline is used as the diazo component. This gives the alkali metal salt of the compound of the formula in the form of its alkali metal salt. It dyes the materials mentioned in the description such as in particular cotton, by the application and fixation processes customary for fiber-reactive dyes in red hues which have high color strength and good fastness properties.

EXAMPLE 16

The aminoazo starting compound 7-(2'-sulfo-5'-aminophenyl)azo-1-benzoylamino-8-naphthol-3,6-disul-

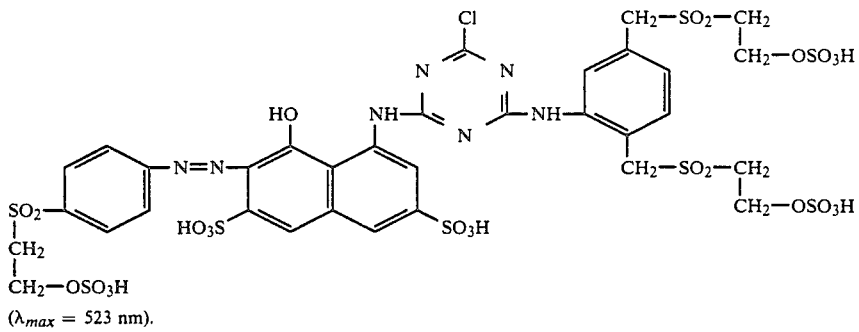

($\lambda_{max}$ = 523 nm).

This dye according to the invention has very good fiber-reactive dye properties and dyes, for example, cotton in strong red shades which have good fastness properties.

EXAMPLE 15

To prepare an azo dye according to the invention, the procedure of Example 13 is repeated, except that the solution of the diazonium salt from 30.3 parts of 2-aminonaphthalene-1,5-disulfonic acid is used instead of the diazonium salt from 2,5-dicarboxyaniline. This gives fonic acid prepared in the usual manner is reacted with the equivalent amount of cyanuric fluoride in accordance with the procedure of Example 1. The difluorotriazinylaminoazo compound thus obtained is reacted further in accordance with the procedure of Example 1 with the equivalent amount of 2,5-bis($\beta$-sulfatoethylsulfonylmethyl)aniline, and the resulting dye according to the invention is isolated from the synthesis solution after a clarifying filtration by spray-drying. Written in the form of the free acid, it has the formula

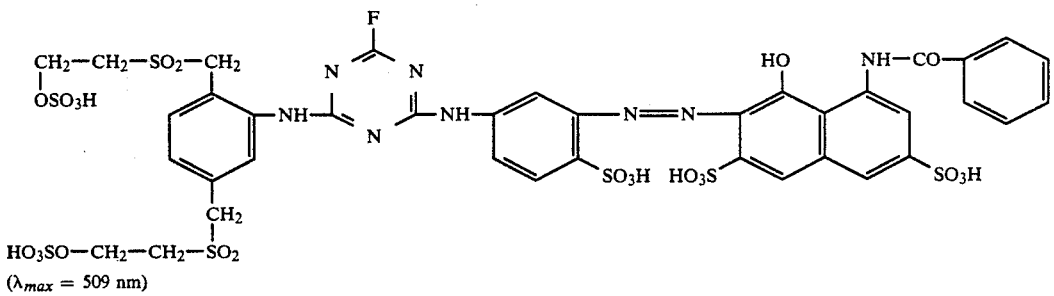

($\lambda_{max} = 509$ nm)

and has very good fiber-reactive dye properties. When applied by the application and fixation processes customary for fiber-reactive dyes, it produces on the materials mentioned in the description, such as in particular cotton, brilliant red dyeings and prints which have good fastness properties.

EXAMPLE 17

64.8 parts of the known copper complex azo compound of the formula

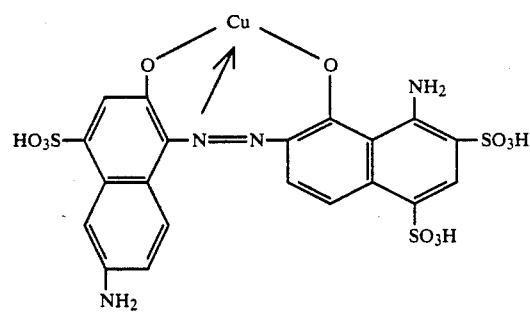

are reacted in aqueous solution (700 parts of water) at a temperature of 0 to 5° C. and a pH of 2 to 3 with 19 parts of cyanuric chloride. 49.7 parts of 3,4-bis(β-sulfatoethylsulfonylmethyl)aniline are then added, and the second condensation reaction is carried out at a pH between 6 and 7 and a temperature of 20° C. The dye according to the invention of the formula (written in the form of the free acid)

is then isolated from the synthesis solution as the alkali metal salt, if necessary after clarifying filtration, by spray-drying. It has very good fiber-reactive dye properties and dyes, for example, cotton by the application processes customary in fiber-reactive dye technology in blue hues which have high color strength and good fastness properties.

EXAMPLE 18

26 parts of the known starting compound of the formula

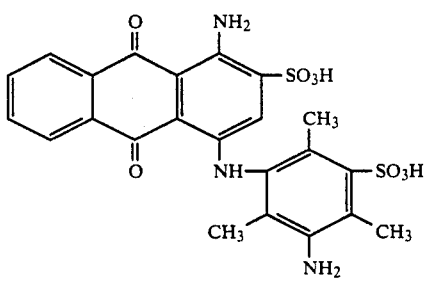

are reacted in aqueous solution at 0 to 5° C. and a pH of 2 to 3 with 10 parts of cyanuric chloride. 26 parts of 2,5-bis(β-sulfatoethylsulfonylmethyl)aniline are then added, and the second condensation reaction is carried out at a pH of 6 to 7 and a temperature of 20 to 25° C. The synthesized anthraquinone dye according to the invention of the formula (written in the form of the free acid)

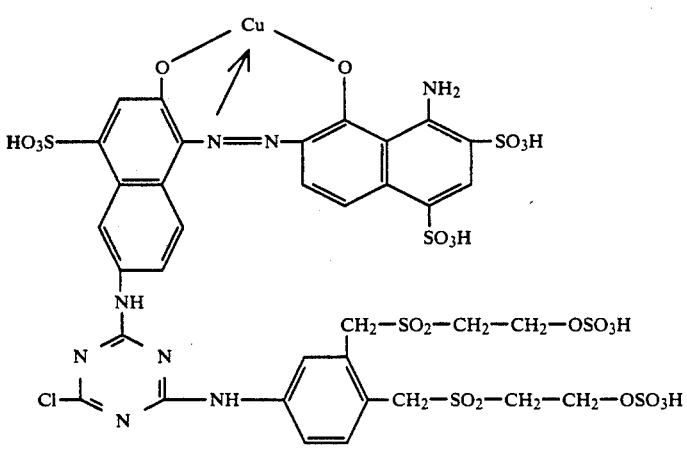

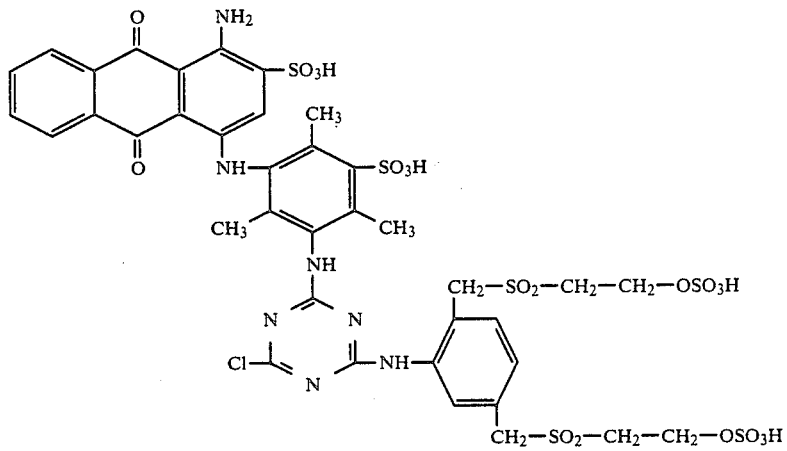

is precipitated from the synthesis solution with potassium chloride and isolated. The dye according to the invention has very good fiber-reactive dye properties and produces, for example, on cotton by the application and fixation methods customary for fiber-reactive dyes, in particular by the known printing processes dyeings and prints in bright blue hues which have high color strength and very good light fastness properties.

EXAMPLE 19

A suspension of 31.6 parts of 1-amino-8-naphthol-3,6-disulfonic acid in 300 parts of water is added at 5° C. to 17.3 parts of aniline-4-sulfonic acid diazotized in hydrochloric acid solution. The coupling reaction is carried out at a pH between 1 and 2 for 8 hours, and then a suspension of 38.6 parts of the primary condensation product from 1,3-phenylenediamine-4-sulfonic acid and cyanuric chloride diazotized in hydrochloric acid solution is added. The coupling reaction is then completed in a weakly acidic solution by means of 17.8 parts of sodium carbonate. A solution of 49.7 parts of 2,5-bis(β-sulfatoethylsulfonylmethyl)aniline is then added, and the second condensation reaction is carried out at a pH of 6.5 and a temperature of 20 to 30° C. The dye is isolated from the synthesis solution, if necessary after previous clarifying filtration, by spray-drying. This gives a black electrolyte-containing powder of the alkali metal salt of the compound of the formula

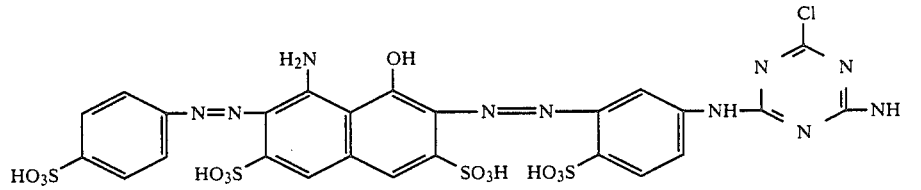
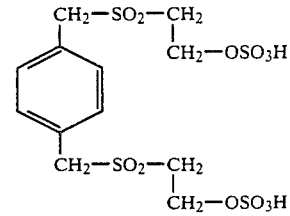

($\lambda_{max}$ = 581 nm)

which dyes cotton by the dyeing processes customary for fiber-reactive dyes in navy hues which have good fastness properties.

EXAMPLE 20

An aqueous solution of the azo compound prepared by acidic coupling of 28.1 parts of diazotized 4-(β-sulfatoethylsulfonyl)aniline and 31.6 parts of 1-amino-3,6-disulfo-8-naphthol is reacted with a suspension of 38.6 parts of the primary condensation product from cyanuric chloride and 1,3-phenylenediamine-4-sulfonic acid diazotized in hydrochloric acid solution at a pH of about 5. A solution of 49.7 parts of 2,5-bis(β-sulfatoethylsulfonylmethyl)aniline is then added, and the condensation reaction is carried out at a pH of 6.5 and a temperature of 20to 30° C. Written in the form of the free acid, the synthesized disazo dye according to the invention has the formula

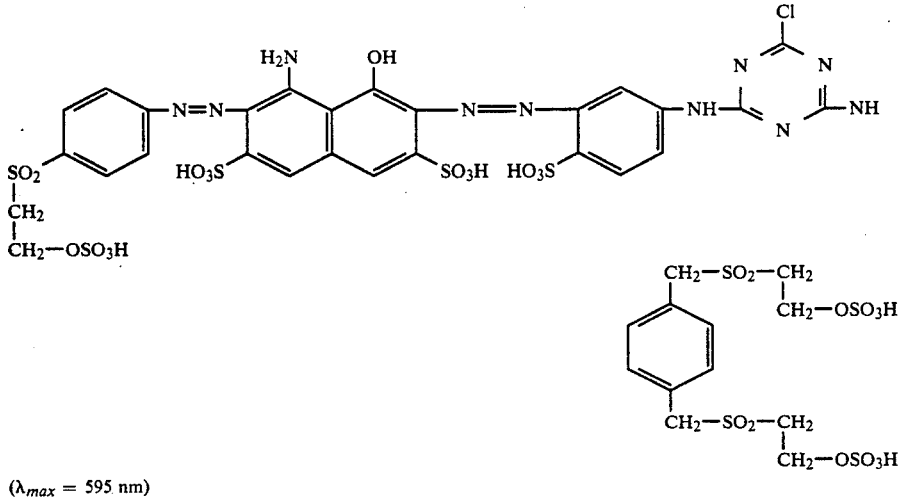

($\lambda_{max}$ = 595 nm)

and has very good fiber-reactive dye properties. It dyes, for example, cotton in navy hues which have good fastness properties.

EXAMPLE 21

15.8 parts of the triphendioxazine compound of the formula

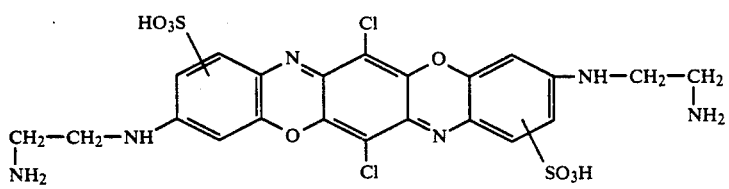

are dissolved in 1500 parts of water at 45° C. at a pH of 9 by means of sodium hydroxide solution. The solution is then cooled to 0 to 5° C., the pH is brought to 7 by means of hydrochloric acid, and a fine suspension of 9.7 parts of cyanuric chloride in 100 parts of ice-water is added. Stirring of the reaction mixture at 0 to 5° C. and a pH between 6.5 and 7 is continued until the reaction is complete, and a neutral solution of 26 parts of 2,5-bis(β-sulfatoethylsulfonylmethyl)aniline in 200 parts of water is then slowly added over a period of 10 minutes. The temperature is increased to 20 to 30° C., and stirring is continued at a pH of 6.5 until the reaction is completed.

The triphendioxazine dye of the formula (written in the form of the free acid)

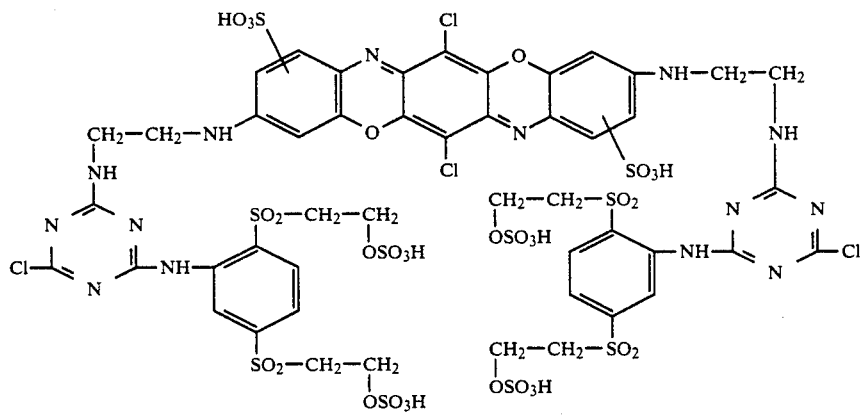

is isolated from the synthesis solution by spray-drying. It has very good fiber-reactive dye properties and dyes, for example, cotton in reddish blue hues which have good fastness properties.

EXAMPLE 22

19.7 parts of a copper phthalocyanine compound of the approximate formula

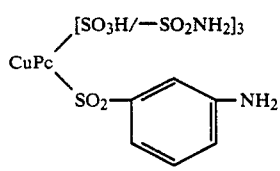

obtained in the usual manner by reacting copper tetra(-chlorosulfonyl)phthalocyanine with aqueous ammonia and 1,3-phenylenediamine in an amount of about 1 mole are suspended in a mixture of 125 parts of ice and 125 parts of water. The pH is adjusted to 7 by means of sodium hydroxide solution. 4 parts of cyanuric fluoride are added at 0 to 2° C., and the pH is maintained between 5.5 and 6 by means of sodium carbonate. After the reaction is completed, a neutral solution of 15 parts of 2,5-bis(β-sulfatoethylsulfonylmethyl)aniline in 100 parts of water is slowly added, the reaction mixture is warmed to 30° C., and the condensation reaction is carried out at a pH of 6.5. The synthesized copper phthalocyanine dye, which, written in the form of the free acid, has the formula

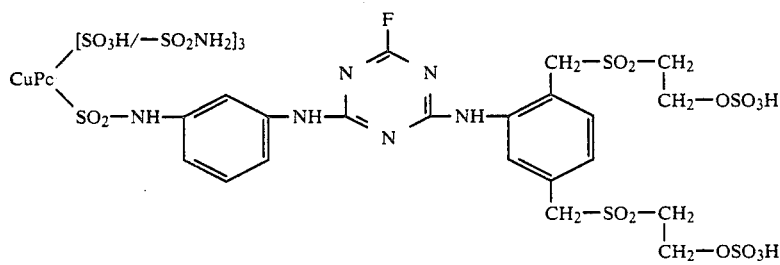

($\lambda_{max}$ = 622 nm)

can be isolated from the synthesis solution by spraydrying. It has very good fiber-reactive dye properties and dyes, for example, cotton in greenish blue hues which have good fastness properties.

EXAMPLE 23

58 parts of the copper phthalocyanine compound of the approximate formula

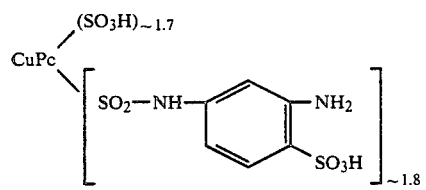

are stirred in a mixture of 300 parts of water and 125 parts of ice, until a homogeneous mixture is obtained; the mixture is adjusted to a pH of 7 with aqueous sodium hydroxide solution. A fine suspension of 16.6 parts of cyanuric chloride in 170 parts of ice water is added, and the temperature is maintained at 0 to 5° C. and the pH at 5.3 to 5.5. As soon as the reaction is completed, a neutral solution of 43.4 parts of 2,5-bis(β-sulfatoethylsulfonylmethyl)aniline in 250 parts of water is slowly added. The mixture is warmed to 20 to 30° C., and the condensation reaction is carried out at a pH of 6.5 for 4 hours.

The resulting copper phthalocyanine dye according to the invention of the formula (written in the form of the free acid)

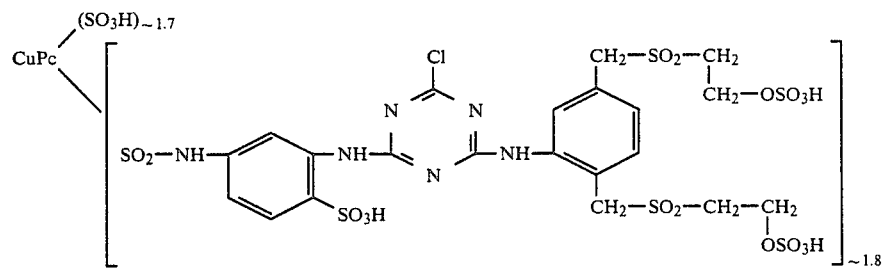

is isolated from the solution in the form of its sodium salt by spray-drying. It has very good fiber-reactive dye properties and dyes, for example, cotton in greenish blue hues which have good fastness properties.

EXAMPLE 24

A neutral solution of 58.4 parts of the known starting copper formazan compound of the formula

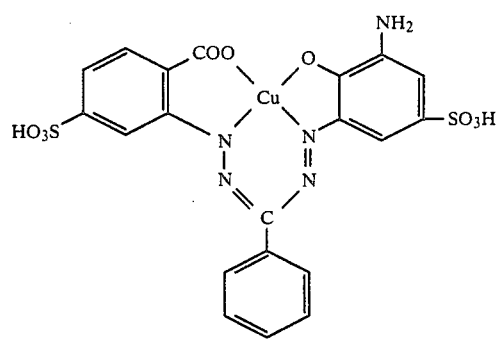

is reacted at a temperature between 0 and 5° C. with 19 parts of finely dispersed cyanuric chloride at a pH of 3.5 to 4.5. As soon as the primary condensation reaction is completed, a neutral solution of 49.7 parts of 2,5-bis(β-sulfatoethylsulfonylmethyl)aniline in 200 parts of water is added, and the second condensation reaction is carried out at a temperature of 30 to 40° C. and a pH of 6.5.

The resulting copper formazan dye according to the invention of the formula (written in the form of the free acid)

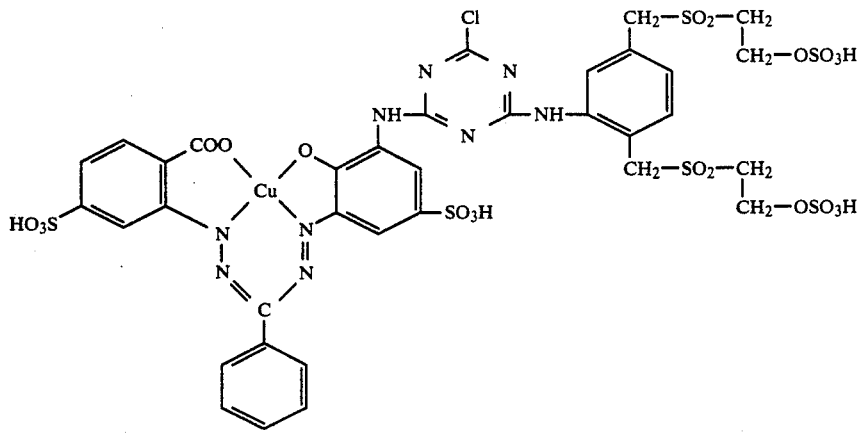

($\lambda_{max}$ = 608 nm)

is isolated from the synthesis solution in the form of the alkali metal salt, such as in particular the potassium salt, by salting out with potassium chloride. It has very good fiber-reactive dye properties and dyes, for example, cotton in blue hues which have good fastness properties.

EXAMPLES 25 to 98

In the Table Examples which follow, further fiber-reactive dyes according to the invention are described. They also have very good dye properties and produce on the materials mentioned in the description, such as in particular cellulose fiber materials, by the application and fixation processes customary in fiber-reactive dye technology, dyeings and prints of the hue listed in the particular Table Example, which have high color strength and good fastness properties. They can be prepared according to the invention by the procedure customary for the particular type of dye and known to those skilled in the art from the components evident from the particular dye formula, for example analogously to one of the abovementioned Working Examples.

| Example | Structure | X | Hue |
|---------|-----------|---|-----|
| 25 | (structure with HO₃S-H₂C- substituent on pyridone ring) | Cl | Citrus yellow |
| 26 | (structure with H₂N-C(=O)- substituent on pyridone ring and SO₃H on middle ring) | Cl | Citrus yellow |
| 27 | (structure with H₂N-C(=O)- substituent on pyridone ring) | Cl | Citrus yellow |

| Example | Structure | X | Hue |
|---|---|---|---|
| 28 | | Cl | Citrus yellow |
| 29 | | Cl | Golden yellow |
| 30 | | Cl | Golden yellow |
| 31 | | Cl | Golden yellow |

-continued

| Example | Structure | X | Hue |
|---|---|---|---|
| 32 | (dye structure with naphthalene-SO₃H/HO₃S/SO₃H — N=N — phenyl(NHCONH₂) — NH — triazine(X) — NH — phenyl(CH₂SO₂CH=CH₂)₂) | Cl | Golden yellow |
| 33 | (dye structure with naphthalene-SO₃H/HO₃S/SO₃H — N=N — phenyl(OCH₃)(CH₃) — NH — triazine(X) — NH — phenyl(CH₂SO₂C₂H₄OSO₃H)₂) | Cl | Golden yellow |
| 34 | (dye structure with naphthalene-SO₃H/HO₃S — N=N — phenyl(NHCONH₂) — NH — triazine(X) — NH — phenyl(CH₂SO₂C₂H₄OSO₃H)₂) | Cl | Golden yellow |
| 35 | (dye structure with phenyl(SO₃H) — N=N — naphthol(OH)(HO₃S) — NH — triazine(X) — NH — phenyl(CH₂SO₂C₂H₄OSO₃H)₂) | Cl | Yellowish orange |

-continued
| Example | | X | Hue |
|---|---|---|---|
| 36 | 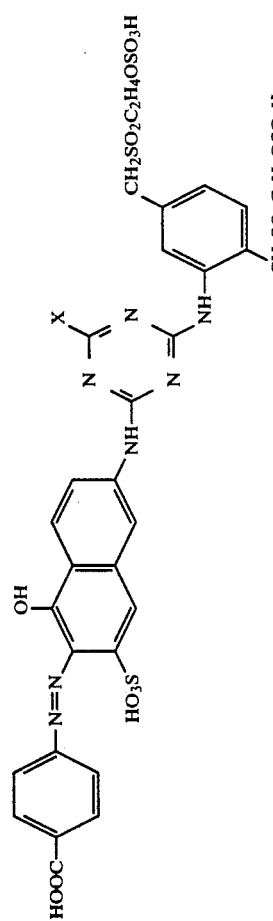 | | Cl Orange |
| 37 | 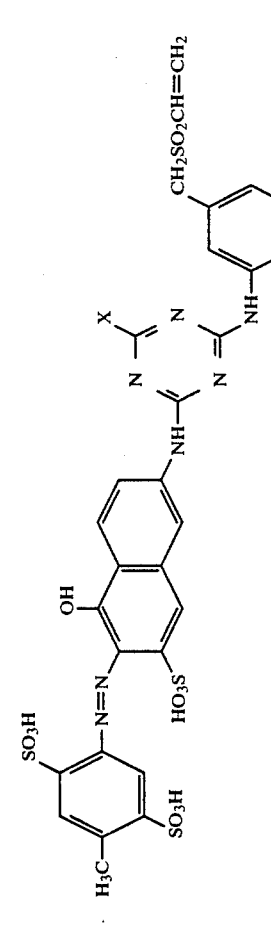 | | Cl Orange |
| 38 | 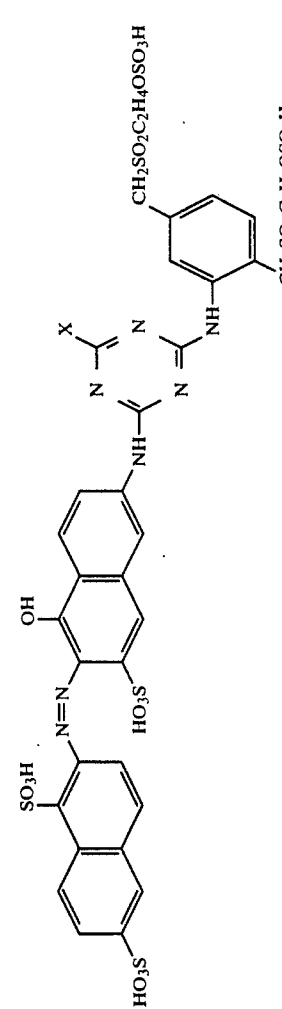 | | Cl Reddish orange |

-continued

| Example | Structure | X | Hue |
|---------|-----------|---|-----|
| 39 | | Cl | Scarlet |
| 40 | | Cl | Scarlet |
| 41 | | Cl | Scarlet |

-continued

| Example | | X Hue |
|---|---|---|
| 42 | (structure) | Cl Scarlet |
| 43 | (structure) | Cl Scarlet |
| 44 | (structure) | Cl Red |

-continued

| Example | (structure) | X | Hue |
|---|---|---|---|
| 45 | | Cl | Yellowish red |
| 46 | | Cl | Scarlet |
| 47 | | Cl | Yellowish red |
| 48 | | Cl | Bluish red |

-continued

| Example | | X | Hue |
|---|---|---|---|
| 49 | [structure] | Cl | Bluish red |
| 50 | [structure] | Cl | Bluish red |
| 51 | [structure] | Cl | Red |

-continued

| Example | | X | Hue |
|---|---|---|---|
| 52 | (structure) | Cl | Navy blue |
| 53 | (structure) | Cl | Navy blue |
| 54 | (structure) | Cl | Navy blue |

-continued

| Example | [Structure] | X | Hue |
|---|---|---|---|
| 55 | [dye structure with naphthalene bearing OH, NH2, SO3H groups, diazo-linked to sulfonaphthalene and to sulfophenyl-triazine-NH-phenyl with two CH2SO2CH=CH2 groups] | Cl | Navy blue |
| 56 | [dye structure with naphthalene bearing NH2, OH, SO3H groups, diazo-linked to sulfonaphthalene and to sulfophenyl-triazine-NH-phenyl with two CH2SO2CH=CH2 groups] | Cl | Navy blue |
| 57 | [dye structure with pyridone coupler (CH3, HO3S-H2C, N-C2H5, OH) diazo-linked to sulfophenyl-triazine-NH-phenyl with two CH2SO2C2H4OSO3H groups] | Cl | Citrus yellow |

| Example | | Cl Hue |
|---|---|---|
| 58 | (structure) | Cl Blue |
| 59 | (structure) | Cl Blue |
| 60 | (structure) | Cl Blue |

-continued
| | | |
|---|---|---|
| 61 | 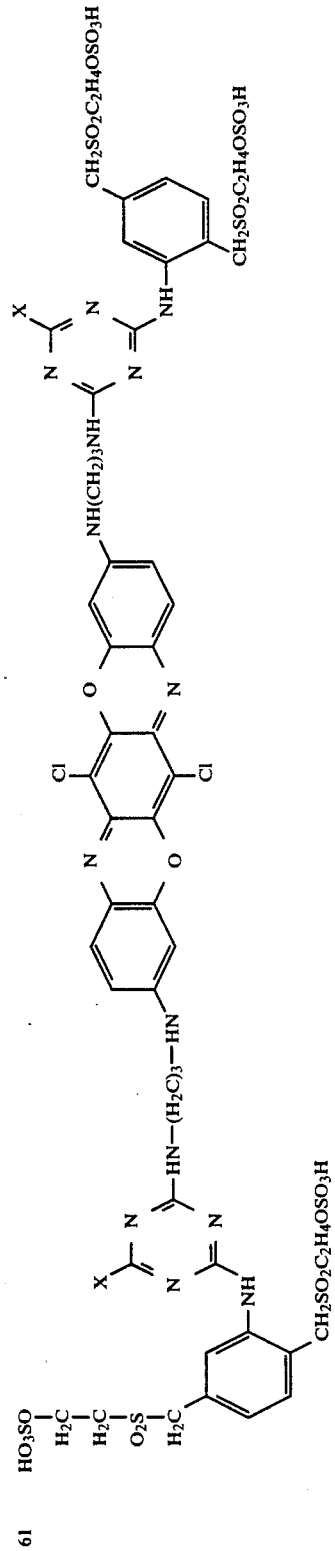 | Cl Reddish blue |
| 62 | 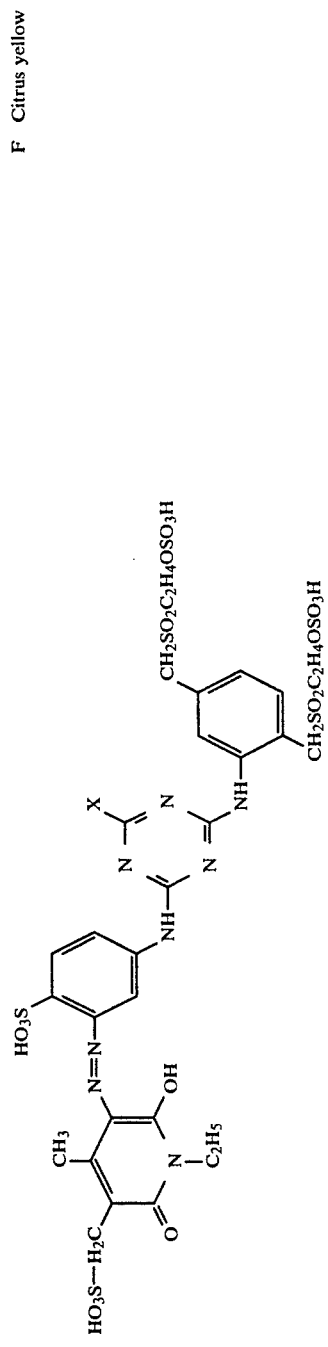 | F Citrus yellow |
| 63 | 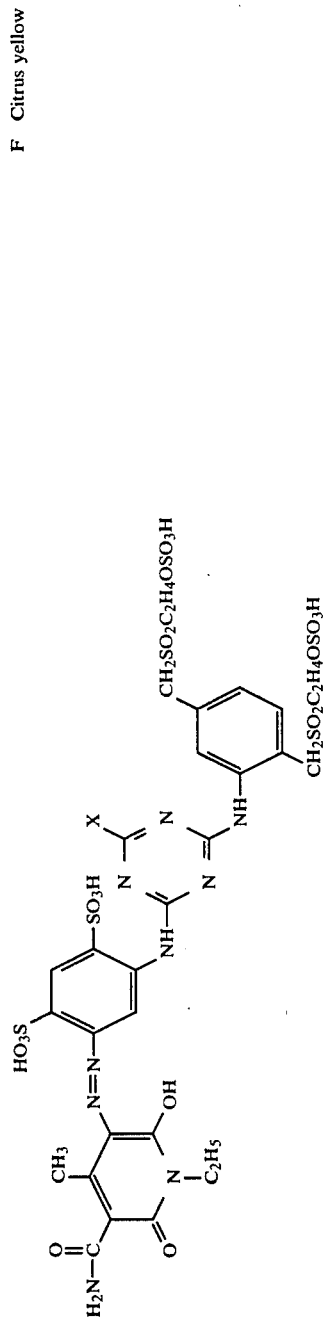 | F Citrus yellow |

| Example | | X | Hue |
|---|---|---|---|
| 64 | structure with pyridone azo coupled to triazine bearing two CH₂SO₂C₂H₄OSO₃H groups | F | Citrus yellow |
| 65 | similar pyridone azo triazine structure with CH₂SO₂C₂H₄OSO₃H groups | F | Citrus yellow |
| 66 | naphthalene disulfonic acid azo–NHCONH₂ aniline–triazine with CH₂SO₂C₂H₄OSO₃H groups | F | Golden yellow |

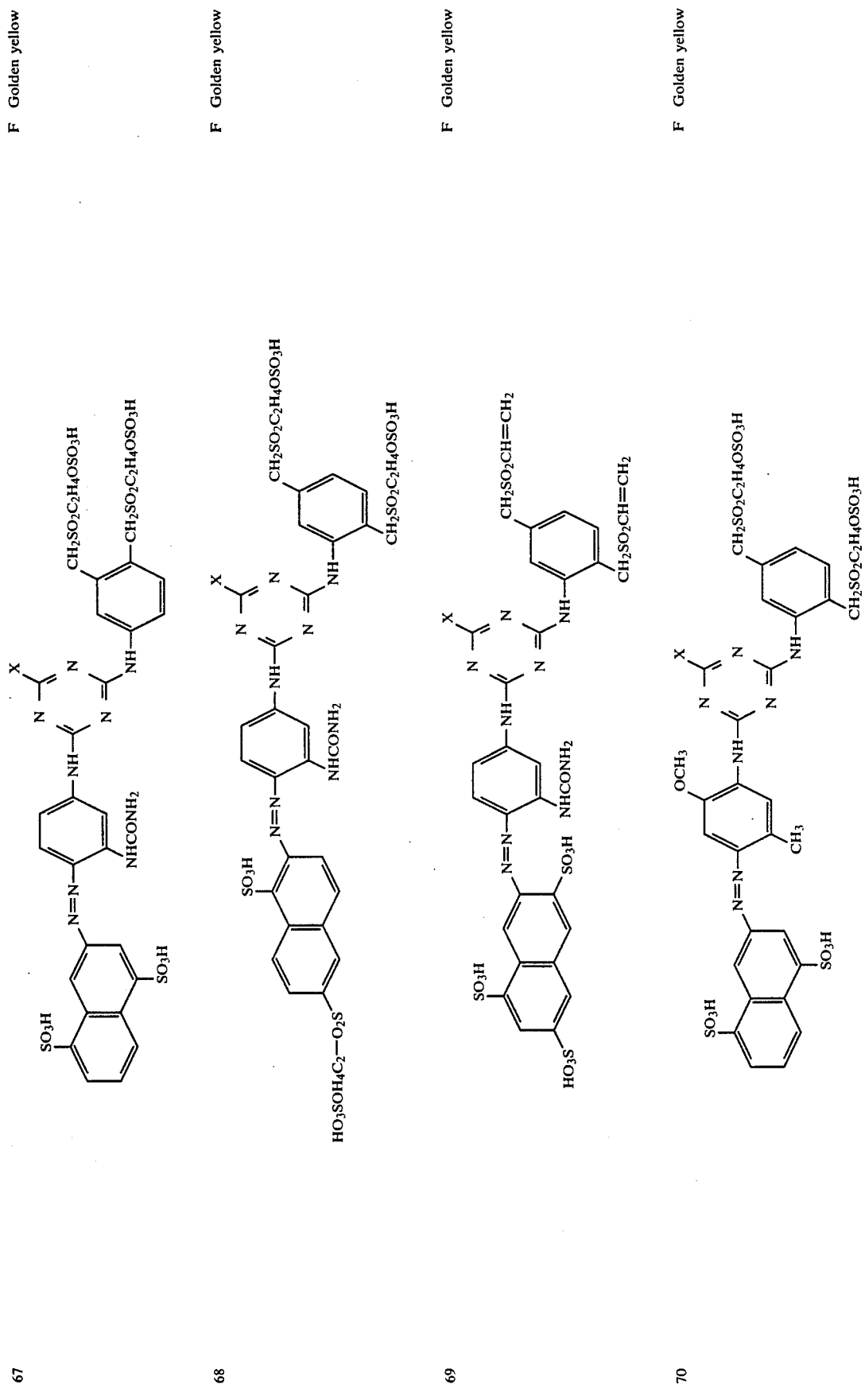

-continued
| | | | |
|---|---|---|---|
| 71 | 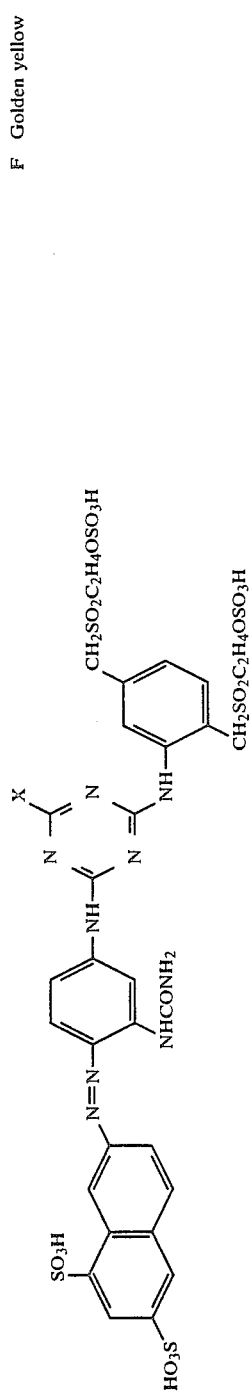 | F | Golden yellow |
| 72 | 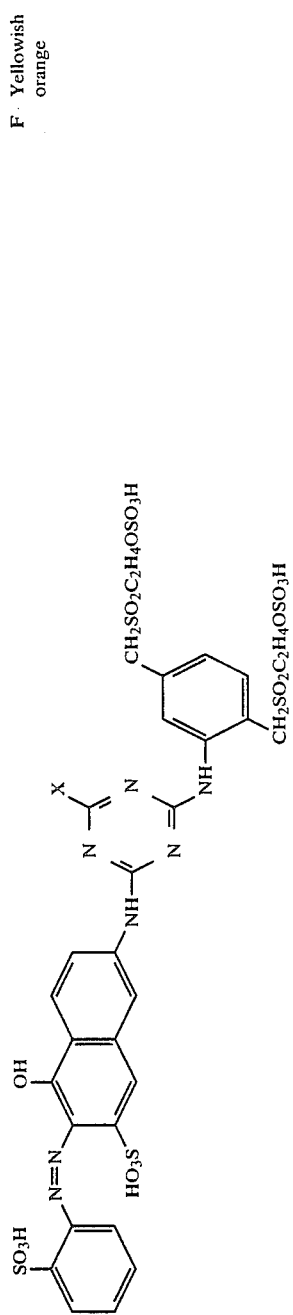 | F | Yellowish orange |
| 73 | 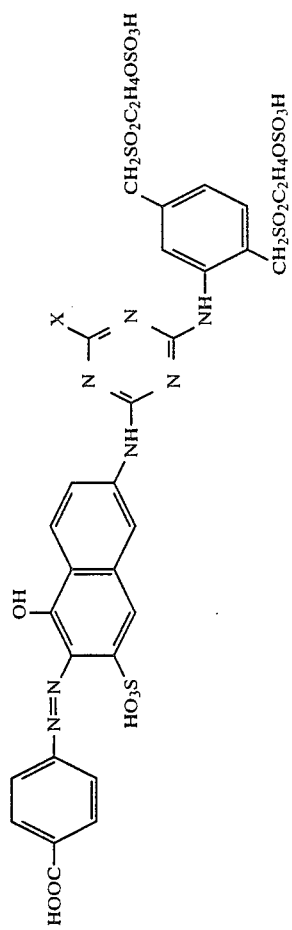 | F | Orange |

| 74 | 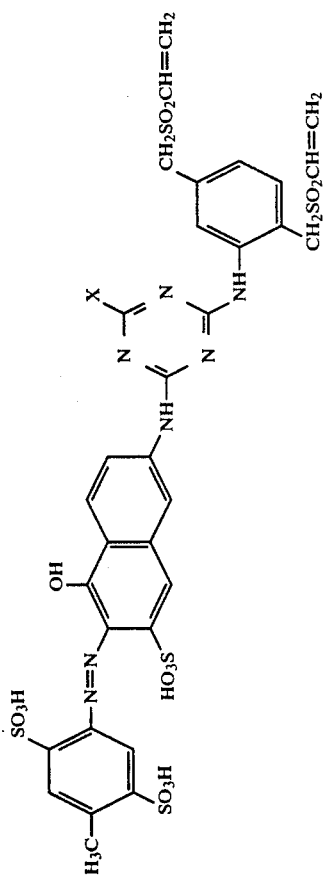 | F | Orange |
| --- | --- | --- | --- |
| 75 | 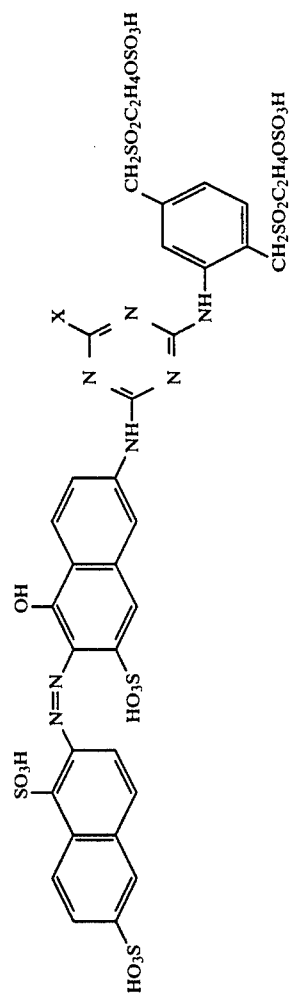 | F | Reddish orange |
| 76 | 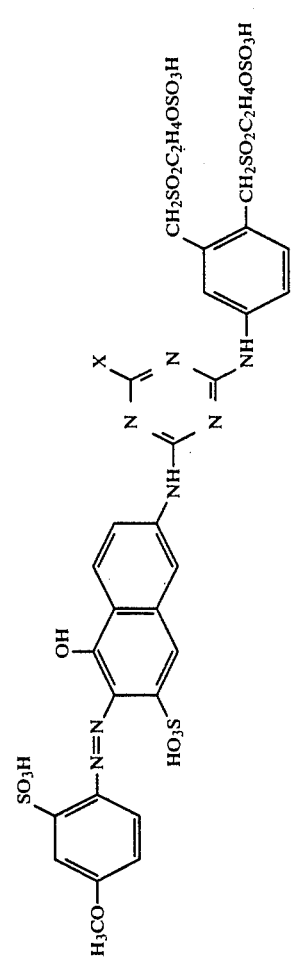 | F | Scarlet |

-continued
| | | | |
|---|---|---|---|
| 77 | 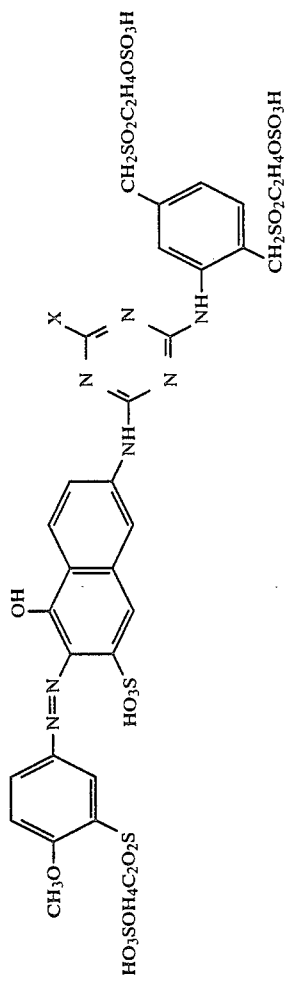 | F | Scarlet |
| 78 | 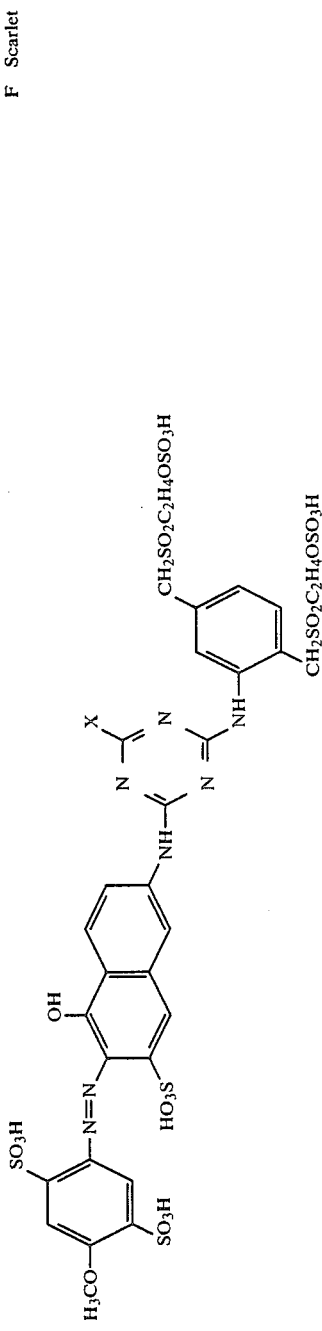 | F | Scarlet |
| 79 | 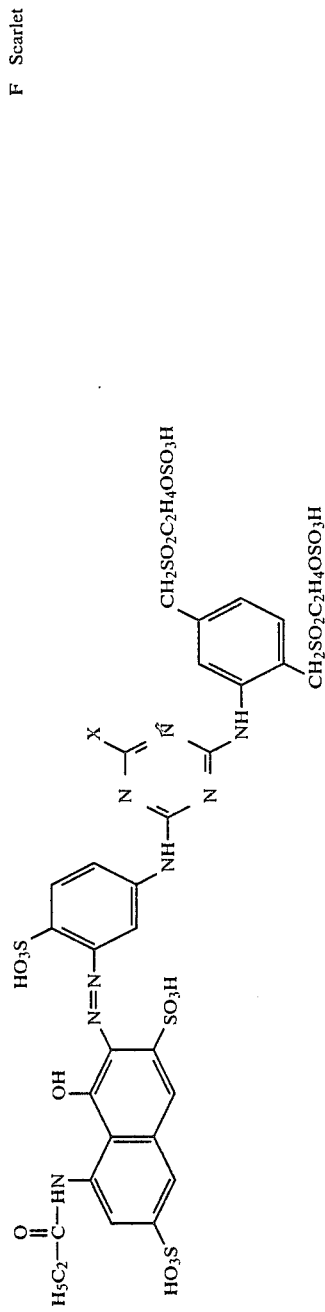 | F | Scarlet |

| | | | |
|---|---|---|---|
| 80 | 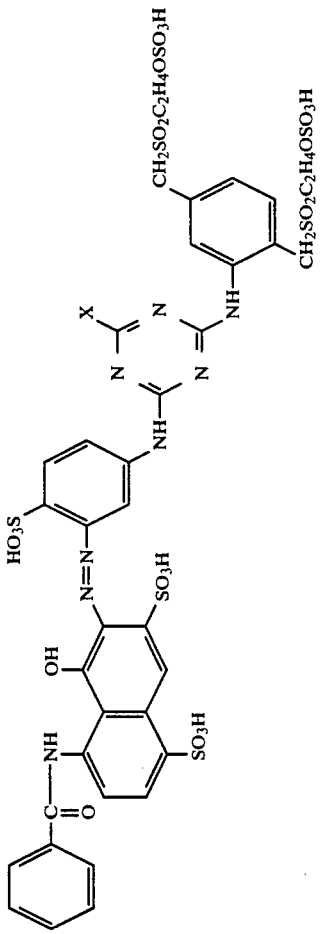 | F | Scarlet |
| 81 | 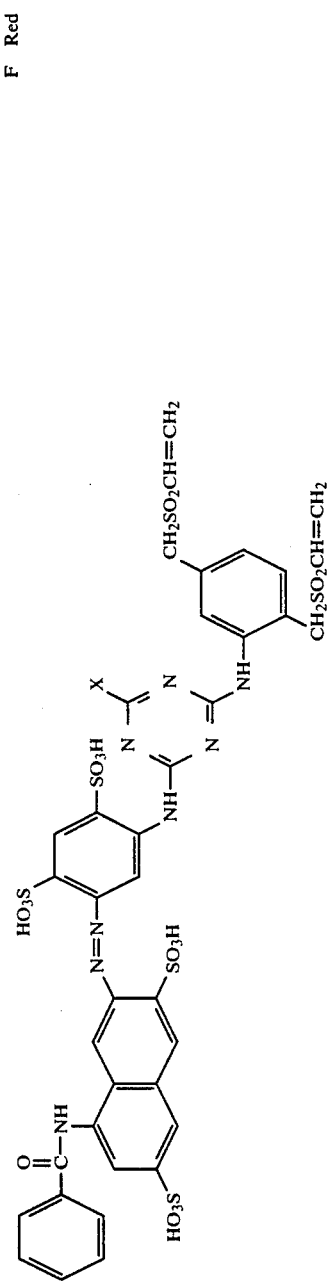 | F | Red |
| 82 | 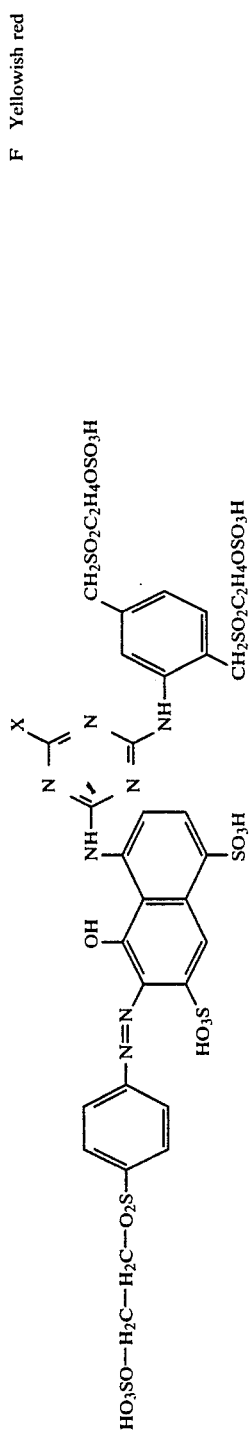 | F | Yellowish red |

| | | | |
|---|---|---|---|
| 83 | 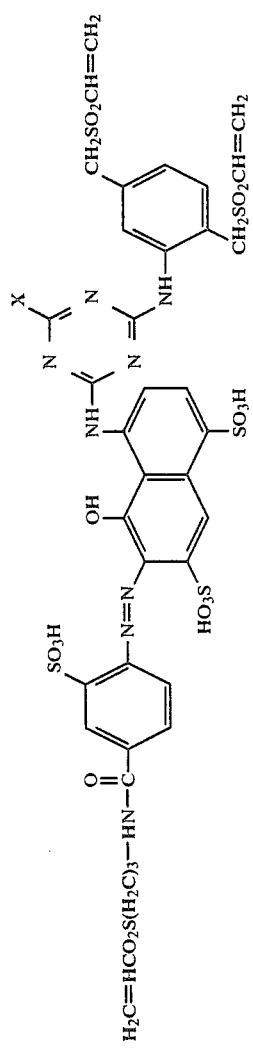 | F | Scarlet |
| 84 | 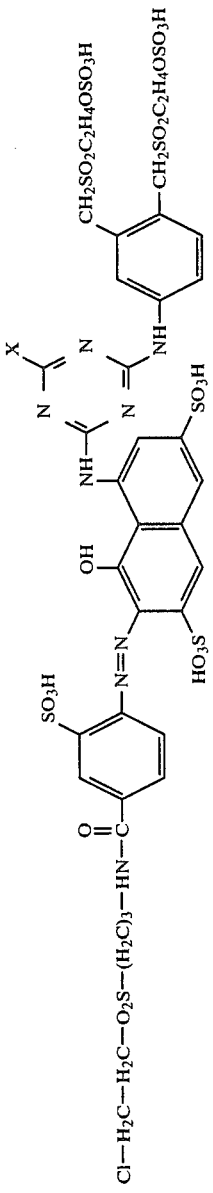 | F | Yellowish red |
| 85 | 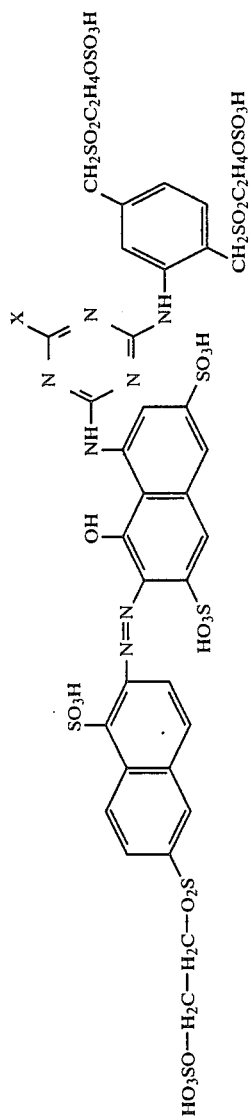 | F | Bluish red |
| 86 | 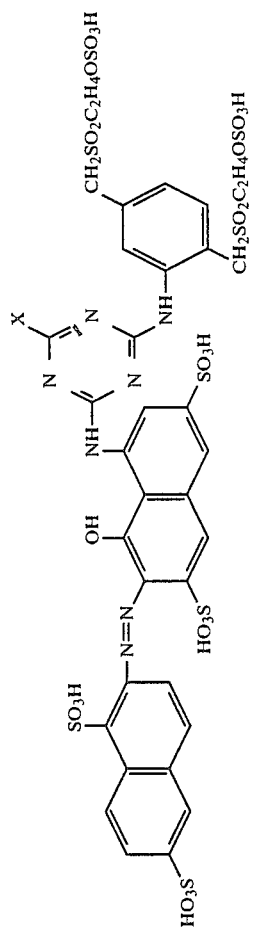 | F | Bluish red |

-continued
| | | | |
|---|---|---|---|
| 87 | 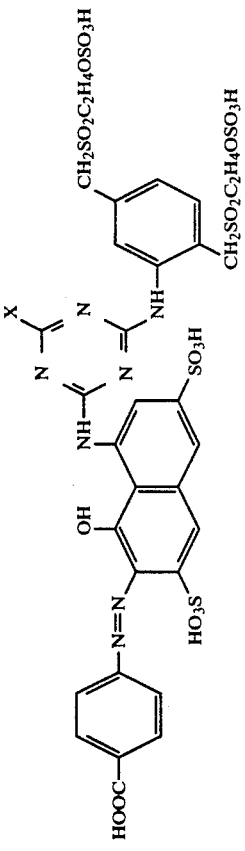 | F | Bluish red |
| 88 | 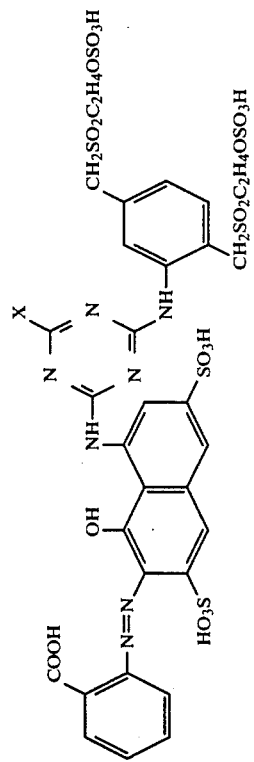 | F | Red |
| 89 | 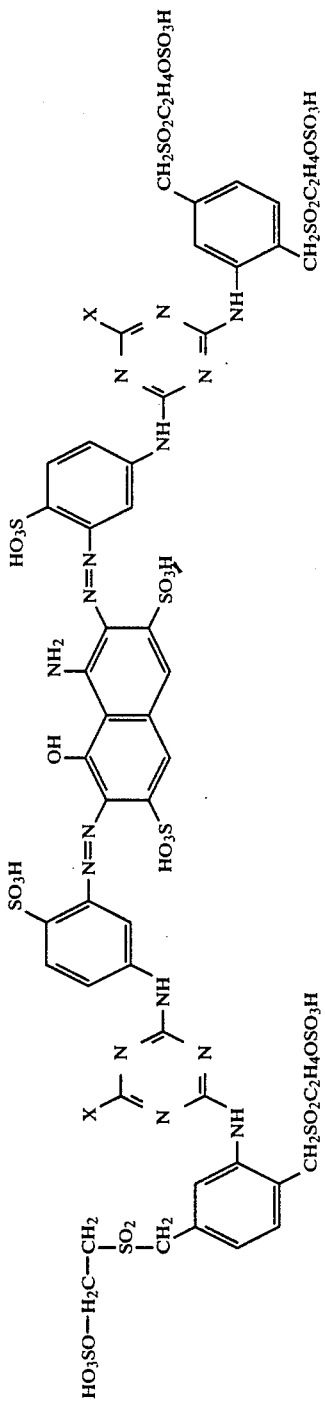 | F | Navy blue |

-continued
| 90 | 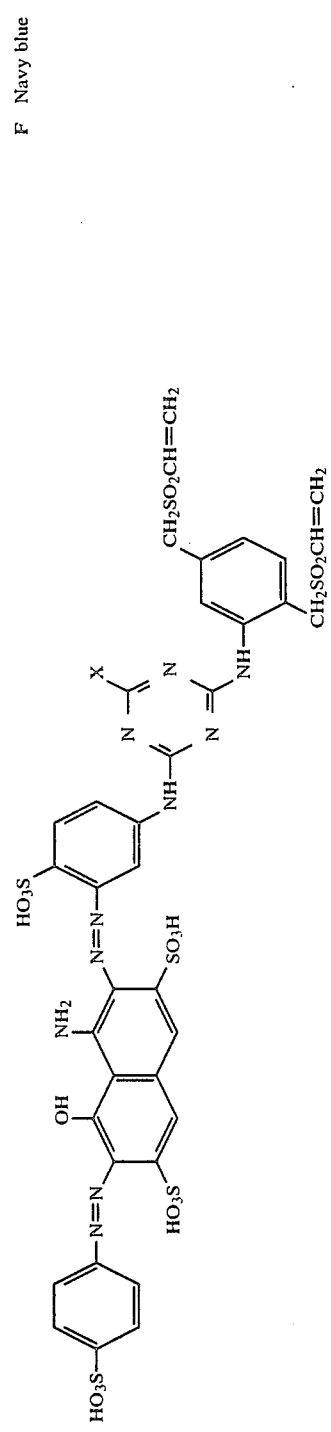 | F | Navy blue |
| --- | --- | --- | --- |
| 91 | 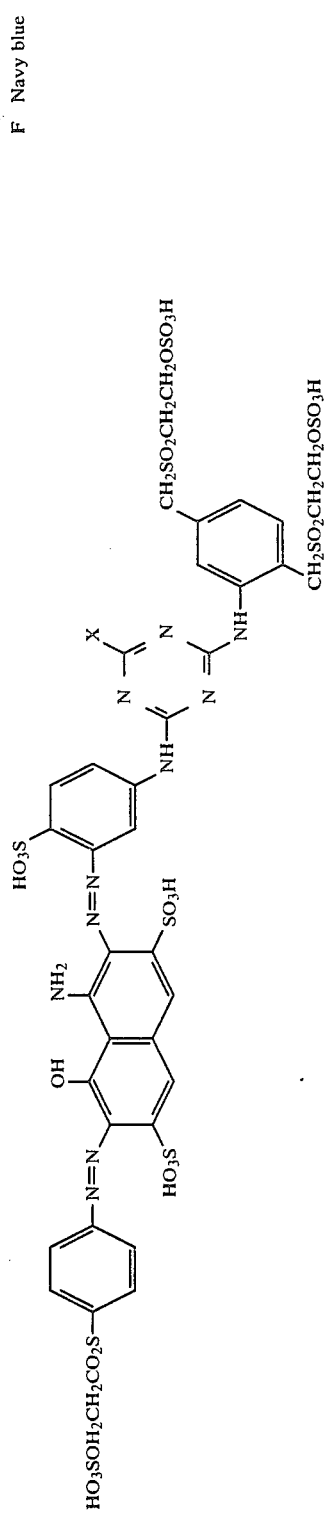 | F | Navy blue |
| 92 | 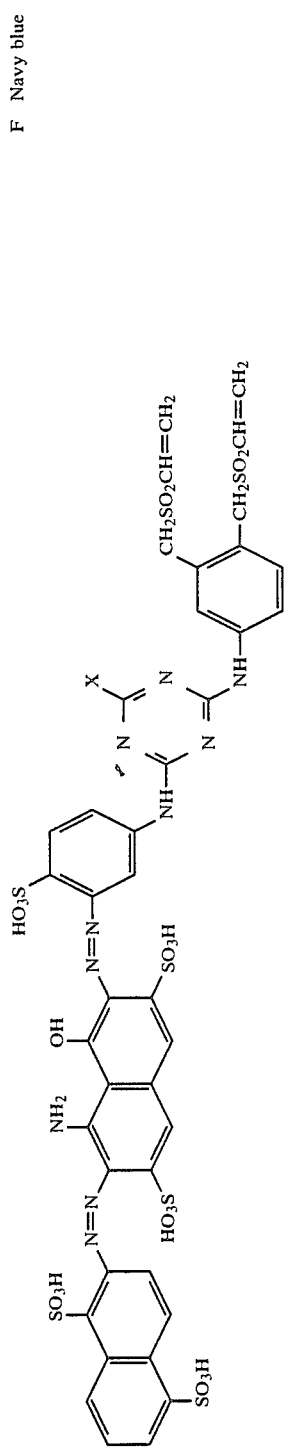 | F | Navy blue |

-continued
| | | |
|---|---|---|
| 93 | 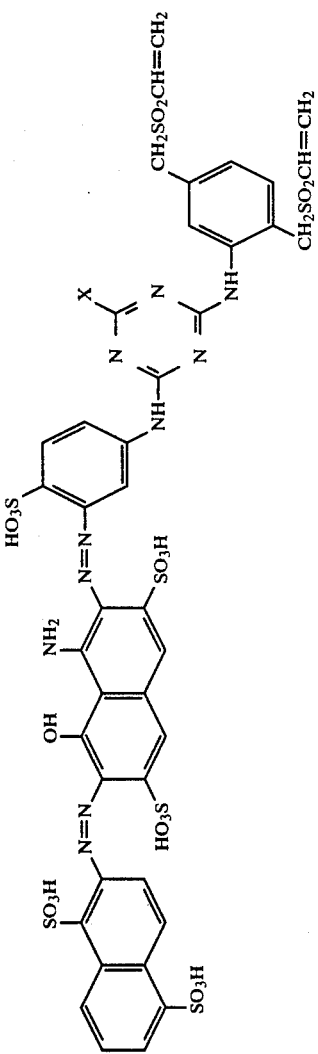 | F Navy blue |
| 94 | 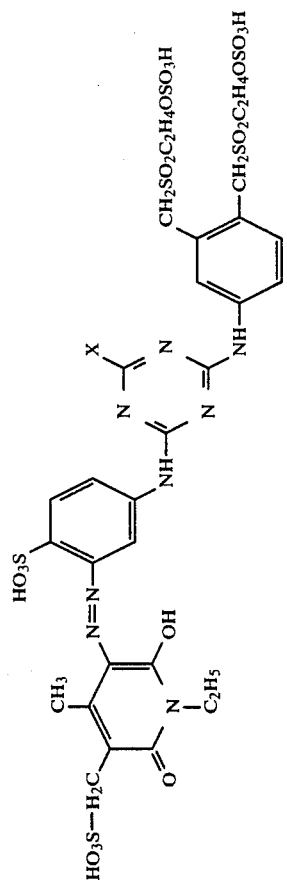 | F Citrus yellow |
| 95 | 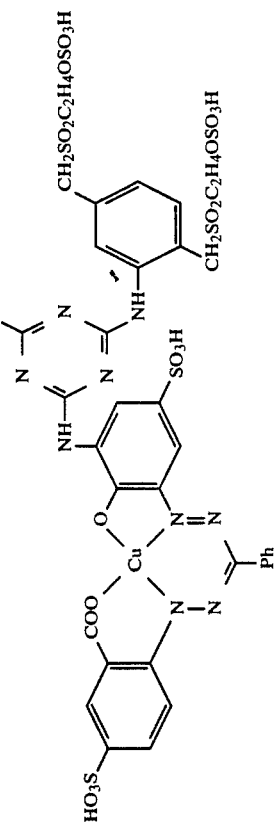 | F Blue |

-continued
| | | |
|---|---|---|
| 96 | 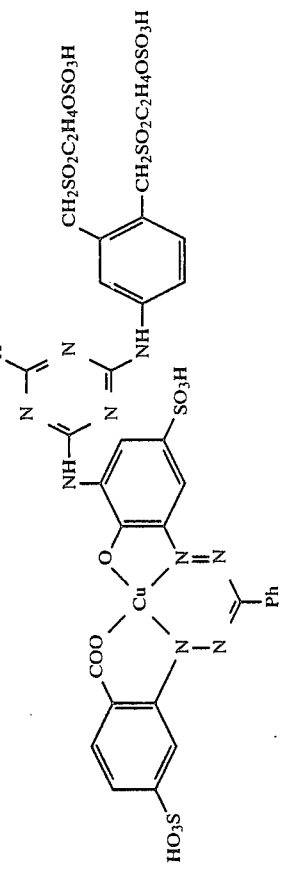 | F Blue |
| 97 | 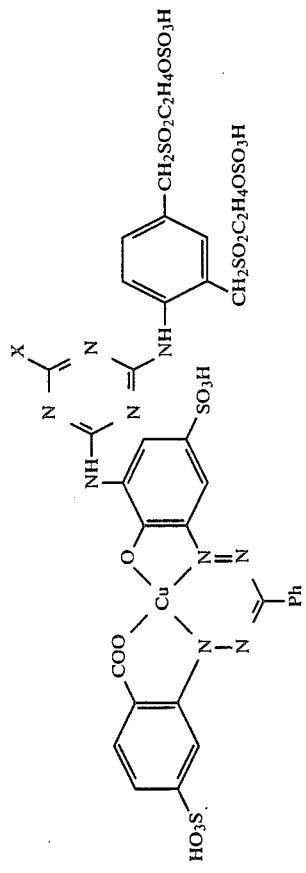 | F Blue |
| 98 | 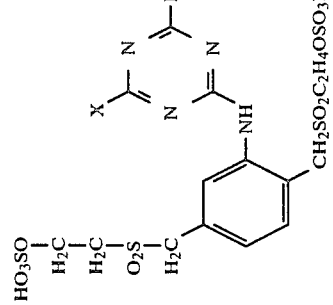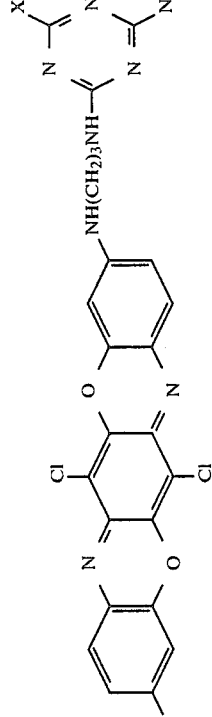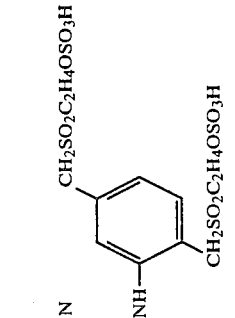 | F Reddish blue |

APPLICATION EXAMPLE 1

900 parts of an aqueous dyebath which contains 2 parts of the dye according to the invention of Example 1 and 80 parts of sodium chloride in dissolved form are entered at 40° C. with 100 parts of a cotton fabric. The dyeing is first carried out at 40° C. for 45 minutes and 100 parts of an aqueous solution containing 1.6 parts of sodium hydroxide and 2 parts of calcined sodium carbonate in dissolved form are then added. Dyeing at 40° C. is continued for another 45 minutes, and the dyed material is then rinsed in the usual manner with cold and warm water, soaped in a boiling aqueous bath containing a nonionic detergent, rinsed again with water and dried. A golden yellow dyeing which has high color strength and good fastness properties is obtained.

APPLICATION EXAMPLE 2

1900 parts of an aqueous dyebath which contains 2 parts of the dye according to the invention of Example 1 and 80 parts of sodium chloride in dissolved form are entered at 35° C. with 100 parts of a cotton fabric. The dyeing is first carried out at 35° C. for 20 minutes and 100 parts of an aqueous solution containing 1.6 parts of sodium hydroxide and 2 parts of calcined sodium carbonate in dissolved form are then added. Dyeing at 35° C. is continued for another 15 minutes, the dyeing temperature is then increased to 60° C. over a period of 20 minutes and the dyeing process is completed at 60° C. over a period of 35 minutes, and the dyed material is then rinsed in the usual manner with cold and warm water, soaped in a boiling aqueous bath containing a nonionic detergent, rinsed again with water and dried. A golden yellow dyeing which has high color strength and good fastness properties ties is obtained.

APPLICATION EXAMPLE 3

1800 parts of an aqueous dye bath which contains 8 parts of the dye according to the invention of Example 1 and 140 parts of sodium sulfate in dissolved form are entered at 25° C. with 100 parts of a cotton fabric. The dyeing is first carried out at 25° C. for 10 minutes and 200 parts of an aqueous solution of 30 parts of trisodium phosphate are added. Dyeing at 60° C. is continued for another 10 minutes, and the dyed material is then rinsed in the usual manner with cold and warm water, soaped in a boiling aqueous bath containing a nonionic detergent, rinsed again with water and dried. A golden yellow dyeing which has high color strength and good fastness properties is obtained.

APPLICATION EXAMPLE 4

50 parts of an aqueous solution of 0.5 part of sodium hydroxide and 2 parts of calcined sodium carbonate are added to a solution of 4 parts of the dye according to the invention of Example 1 in 50 parts of water. Using this dye liquor, a cotton fabric is padded up to a liquor pickup of 70%, wound on a batching roller and left, wrapped in a film, at 20° C. for 3 hours. The dyed fabric is then, as described in Applic. Ex. 1, subjected to an aftertreatment by rinsing, soaping and drying. A golden yellow dyeing which has high color strength and good fastness properties is obtained.

APPLICATION EXAMPLE 5

50 parts of an aqueous solution of 1.6 parts of sodium hydroxide and 4 parts by volume of waterglass of 38° Bé are added to a solution of 6 parts of the dye according to the invention of Example 1 in 50 parts of water. Using this dye liquor, a cotton fabric is padded up to a liquor pickup of 70%, wound on a batching roller and left, wrapped in a film, at 20° C. for 10 hours. The dyed fabric is then, as described in Applic. Ex. 1, subjected to an aftertreatment by rinsing, soaping and drying. A golden yellow dyeing which has high color strength and good fastness properties is obtained.

APPLICATION EXAMPLE 6

2 parts of the dye according to the invention of Example 1 are dissolved in 100 parts of water with the addition of 0.5 part of sodium m-nitrobenzenesulfonate, and, using the solution obtained, a cotton fabric is impregnated up to a liquor pickup of 75%; the impregnated fabric is then dried and padded up to a liquor pickup of 75% with a warm aqueous solution of 20° C. which contains 4 g of sodium hydroxide and 300 g of sodium chloride per liter, the padded fabric is subjected to hot steam of 100-102° C. for 30 seconds and the dyeing obtained is finished by an aftertreatment according to the procedure of Applic. Example 1. A golden yellow dyeing which has high color strength and good fastness properties is obtained.

APPLICATION EXAMPLE 7

3 parts of the dye according to the invention of Example 1 is stirred into a stock thickener which contains 50 parts of a 5% aqueous sodium alginate thickener, 20 parts of urea, 1 part of sodium m-nitrobenzenesulfonate, 1.2 parts of sodium bicarbonate and 27.8 parts of water. Using this print paste, a cotton fabric is printed, dried and then steamed at 102° C. for 2 minutes, using saturated steam. The printed fabric is then finished by the procedure given in Applic. Example 1. A golden yellow print having a high color strength and good fastness properties is obtained.

APPLICATION EXAMPLE 8

5 parts of the dye according to the invention of Example 1 is stirred into a stock thickener which contains 50 parts of a 5% aqueous sodium alginate thickener, 10 parts of urea, 1 part of sodium m-nitrobenzenesulfonate, 2.5 parts of sodium bicarbonate and 36.5 parts of water. Using this print paste, a cotton fabric is printed, dried and then steamed at 102° C. for 8 minutes, using saturated steam. The printed fabric is then finished by the procedure given in Applic. Example 1. A golden yellow print having a high color strength and good fastness properties is obtained.

EXAMPLE A

Synthesis of 2,5-di($\beta$-sulfatoethylsulfonylmethyl)aniline (a) 93.8 parts of mercaptoethanol are dissolved in a mixture of 200 parts of water and 75 parts by volume of a 33% aqueous sodium hydroxide solution; the solution has a pH between 10 and 11. 87.5 parts of 1,4-bis(chloromethyl)benzene and 60.6 parts of a 33% aqueous sodium hydroxide solution are added to this alkaline solution; the mixture is slowly heated to 80° C. and the exothermic reaction is maintained at about 100° C. and the mixture is then stirred at 95° C. for another 30 minutes, diluted with 200 parts of water and then brought to a pH of 7 with hydrochloric acid. After cooling to 10° C., the precipitated product is filtered off with suction, washed with cold water and dried at 50° C. It has a melting point of 89–91° C.

(b) 116.2 parts of the compound 2,5-bis(β-hydroxyethylthiomethyl)benzene obtained in (a) are added together with 1.8 part of sodium tungstate dihydrate to 200 parts by volume of glacial acetic acid. The mixture is heated to 90 to 95° C., and 194.3 parts of a 35% aqueous hydrogen peroxide solution are slowly added over a period of several hours, the mixture is stirred at 100° C. for another hour and then stirred into a mixture of 500 parts of ice and 100 parts of potassium chloride, the precipitated product is filtered off with suction, washed with water and dried. This gives colorless crystals of the compound 2,5-bis(β-hydroxyethylsulfonyl)benzene having a melting point of 209–212° C.

(c) 162 parts of the compound obtained in (b) are added to a mixture of 180 parts by volume of sulfuric acid monohydrate and 18 parts by volume of 65% oleum at a temperature of no more than 40° C. 90.8 parts of nitrating acid consisting of 30% of nitric acid and 70% of sulfuric acid are then slowly added at 30 to 38° C., the reaction mixture is then stirred at 70° C. for another 4 to 5 hours and then stirred into 2000 parts of ice water. To hydrolyze the sulfato group the acidic solution is refluxed for about 3 hours. The mixture is then cooled, the precipitated compound 2,5-di(β-hydroxyethylsulfonylmethyl)nitrobenzene is then filtered off and dried. It has a melting point of 125–126.5° C.

(d) 128.6 parts of the nitro compound obtained in (c) are dissolved in 500 parts of water at 60° C. and a pH of 6.5 and hydrogenated in an autoclave at 80° C. and a hydrogen pressure of 50 bar in the presence of 50 parts of Raney nickel. The mixture is then diluted with 1500 parts of hot water, and the catalyst is filtered off at 95° C. The filtrate is cooled below 10° C., and the 2,5-di(β-hydroxyethylsulfonylmethyl)aniline precipitates. It has a melting point of 201° C.

(e) 84.3 parts of the aniline compound obtained in (d) are added at a temperature of no more than 20° C. to a mixture of 200 parts of sulfuric acid monohydrate and 125 parts of 20% oleum over a period of 30 minutes. The mixture is stirred for about another 4 hours and then stirred into 1000 parts of ice. Excess sulfuric acid is neutralized by means of whiting. The precipitated calcium sulfate is filtered off with suction and washed with water, and the combined filtrates are evaporated to dryness at 50° C. This gives 2,5-di(β-sulfatoethylsulfonylmethyl)aniline of melting point above 360° C. (f) The β-sulfatoethylsulfonyl compound obtained in (e) can be converted to its vinylsulfonyl derivative, which can also serve for better characterization of the structure of the sulfato derivative. To convert the β-sulfatoethylsulfonyl compound to the vinylsulfonyl compound, 30 parts of the salt-containing product obtained in (e) are added to 250 parts of water, the pH is adjusted to a value between 10 and 11 by means of aqueous sodium hydroxide solution, and the mixture is maintained at 40 to 45° C. for 1 hour. The resulting 2,5-di-(vinylsulfonylmethyl)-aniline precipitates, is filtered off with suction, washed salt-free and dried.

The vinylsulfonyl compound has the following $^1$H—NMR data (in $d_6$-dimethyl sulfoxide; at 300 MHz):
δ(in ppm): 7.02 (d, 1H); 6.91 (m, 2H); 6.65 (d, 1H); 6.52 (dd, 1H); 6.16 (dd, 2H); 6.12 (dd, 2H); 5.29 (s, 2H); 4.14 (s, 2H); 4.32 (s, 2H).

We claim:

1. A water-soluble dye of the general formula (1)

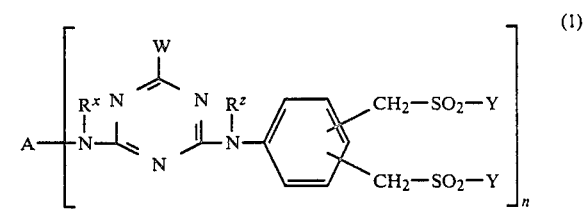

in which

A is the radical of a monoazo, disazo or polyazo dye or of a heavy metal complex azo dye or of an anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye;

$R^x$ is hydrogen of alkyl of 1 to 4 carbons, which is unsubstituted or substituted by halogen, hydroxyl, cyano, alkoxy of 1 to 4 carbons, alkoxycarbonyl of 2 to 5 carbons, carboxyl, sulfamoyl, sulfo or sulfato;

$R^z$ is hydrogen or alkyl of 1 to 4 carbons, which is unsubstituted or substituted by halogen, hydroxyl, cyano, alkoxy of 1 to 4 carbons, alkoxycarbonyl of 2 to 5 carbons, carboxyl, sulfamoyl, sulfo or sulfato;

W is fluorine, chlorine, bromine, sulfo, phenylsulfonyl or alkylsulfonyl of 1 to 4 carbons, Y is vinyl or β-sulfatoethyl, β-thiosulfatoethyl, β-phosphatoethyl, β-alkanoyloxyethyl of 2 to 5 carbons, in the alkanoyl radical, β-benzoyloxyethyl, β-(sulfobenzoyloxy)ethyl, β-(p-toluenesulfonyloxy)ethyl or β-halogenoethyl;

n is the number 1 or 2.

2. A dye as claimed in claim 1, wherein W is fluorine or chlorine.

3. A dye as claimed in claim 1, wherein Y is β-sulfatoethyl.

4. A dye according to claim 1, wherein $R^x$ is hydrogen or methyl.

5. A dye according to claim 1, wherein $R^z$ is hydrogen.

6. A dye according to claim 1, wherein n is 1.

7. A dye according to claim 2, wherein $R^x$ is hydrogen or methyl.

8. A dye according to claim 2, wherein $R^z$ is hydrogen.

9. A dye according to claim 2, wherein n is 1.

10. A dye according to claim 3, wherein $R^x$ is hydrogen or methyl.

11. A dye according to claim 3, wherein $R^z$ is hydrogen.

12. A dye according to claim 3, wherein n is 1.

13. A dye claimed in claim 2, wherein Y is β-sulfatoethyl.

* * * * *